United States Patent [19]
Kopp et al.

[11] Patent Number: 5,643,455
[45] Date of Patent: Jul. 1, 1997

[54] CONCENTRATION OF SOLIDS IN A SUSPENSION USING HOLLOW FIBRE MEMBRANES

[75] Inventors: Clinton Virgil Kopp, Castle Hill; Ian Dracup Doig, Rosville Chase, both of Australia; Robert John William Streeton, Winchester, England; Jalel Michel Darzi, Parramatta, Australia

[73] Assignee: Memtel Limited, Australia

[21] Appl. No.: 185,912

[22] PCT Filed: Aug. 7, 1992

[86] PCT No.: PCT/AU92/00419

§ 371 Date: Feb. 22, 1995

§ 102(e) Date: Feb. 22, 1995

[87] PCT Pub. No.: WO93/02779

PCT Pub. Date: Feb. 18, 1993

[30] Foreign Application Priority Data

Aug. 7, 1991 [AU] Australia ................ PK 7646

[51] Int. Cl.⁶ .................................. B01D 61/00
[52] U.S. Cl. .................. 210/636; 210/650; 210/791; 210/333.01; 210/333.1; 210/321.69
[58] Field of Search .................. 210/636, 791, 210/321.78, 321.69, 323.2, 321.79, 321.8, 321.87, 321.88, 321.89, 333.1, 333.07, 650, 333.01

[56] References Cited

U.S. PATENT DOCUMENTS

| | | | |
|---|---|---|---|
| 3,853,756 | 12/1974 | Stana | 210/411 |
| 4,540,490 | 9/1985 | Shibata et al. | 210/323.2 |
| 4,655,927 | 4/1987 | Ford | 210/639 |
| 4,767,539 | 8/1988 | Ford | 210/636 |
| 4,844,809 | 7/1989 | Ashina et al. | 210/636 |
| 4,931,186 | 6/1990 | Ford et al. | 210/636 |
| 4,935,143 | 6/1990 | Koop et al. | 210/636 |
| 5,024,762 | 6/1991 | Ford et al. | 210/321.69 |
| 5,192,456 | 3/1993 | Ishida et al. | 210/323.2 |
| 5,248,424 | 9/1993 | Cote et al. | 210/636 |
| 5,484,528 | 1/1996 | Yagi et al. | 210/323.2 |

FOREIGN PATENT DOCUMENTS

| | | |
|---|---|---|
| 3226989 | 9/1989 | Australia . |
| 180254 | 2/1990 | Japan . |
| 2120952 | 12/1983 | United Kingdom . |
| WO8501449 | 4/1985 | WIPO . |
| WO 86/05116 | 9/1986 | WIPO . |
| WO 86/05697 | 10/1986 | WIPO . |
| WO 86/05997 | 10/1986 | WIPO . |
| WO 88/00494 | 1/1988 | WIPO . |

*Primary Examiner*—Ana Fortuna
*Attorney, Agent, or Firm*—Nixon & Vanderhye P.C.

[57] ABSTRACT

A method of concentrating solids in a liquid suspension using a microporous filter assembly having a plurality of hollow microporous, elastic membranes within a vessel, the method including the steps of applying the suspension to an outer surface of the hollow fibers whereby a portion of the suspension passes through the fibers walls and at least a portion of the solids is retained on or in the hollow fibers or within the vessel as suspended solids; dislodging the retained solids from the fibers by applying a gas under pressure after opening the vessel to atmospheric pressure.

3 Claims, 21 Drawing Sheets

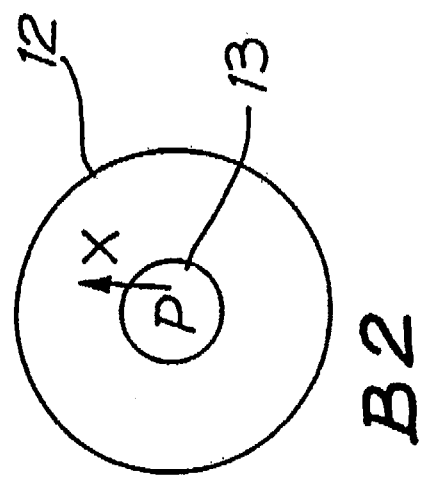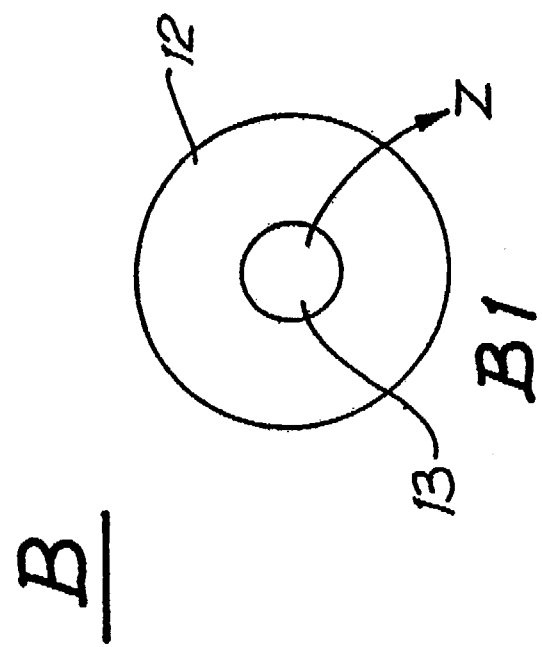
FIG. 3

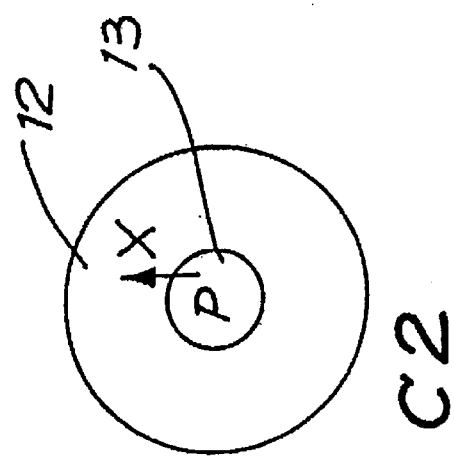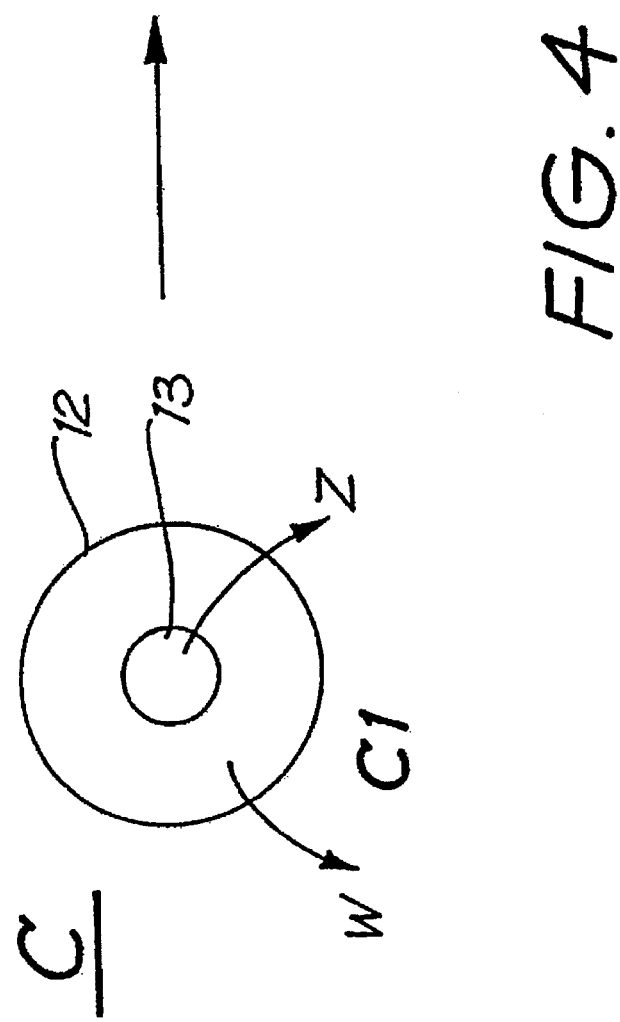
FIG. 4

| Step Description | Time | PV1 | PV2 | PV3 | PV4 | PV5 | PV6 | PV7 | PV8 | PV9 | PV10 | PV11 | PV12 | SVL1 | SVL2 | PUMP |
|---|---|---|---|---|---|---|---|---|---|---|---|---|---|---|---|---|
| Delay | 2 | X | X | X | X | X | X | X | X | X | X | X | X | X | X | OFF |
| Lumen Drain | 6 | X | X | X | X | O | X | X | X | O | X | X | X | O | O | OFF |
| Isolate | 2 | X | X | X | O | O | X | O | X | X | X | X | X | O | O | OFF |
| Pressurise | 0 | X | X | X | O | O | X | O | X | X | O | X | X | O | O | OFF |
| Blowback | 1 | X | X | X | O | O | X | O | X | X | X | O | O | X | X | OFF |
| Pump + Air | 1 | X | O | X | O | X | X | O | X | X | O | O | O | X | X | ON |
| Shell Sweep | 18 | X | O | X | O | X | X | O | X | X | X | X | X | X | X | ON |

| |
|---|
| O - VALVE OPEN |
| X - VALVE CLOSED |
| ON - PUMP ON |
| OFF - PUMP OFF |

FIG. 6

CONCENTRATION OF SOLIDS IN A SUSPENSION USING HOLLOW FIBRE MEMBRANES

FIELD OF THE INVENTION

The present invention relates to concentration of solids in a suspension using a hollow fibre membrane and, in particular forms, to methods and apparatus for periodically cleaning by backwashing the hollow fibre membranes.

BACKGROUND ART

Prior art methods of concentrating solids in a liquid suspension are described in Australian patent specifications 576,424 and 582,968. The text and drawings of these specifications are incorporated herein by cross-reference. In that prior art, concentration is effected by a filter element that comprises a bundle of hollow, porous, polymeric fibres in a closed cartridge or shell. Polyurethane potting compound is used to hold the respective ends of the fibres in place within the cartridge without blocking the fibre lumens and to close off each end of the cartridge.

The transmembrane pressure differential necessary to effect concentration of the solids in the prior art is achieved by pressurising the feedstock which necessitates the use of pumps, other ancillary equipment and, of course, a closed filter cartridge.

Backwashing of such prior art concentrators involves increasing the pressure on both sides of the hollow fibres within the closed shell to a relatively high value before suddenly releasing that pressure on the shell side of the fibre walls to effect a sudden pressure differential across the walls which causes a backwash action.

DISCLOSURE OF THE INVENTION

It is an object of this invention to provide an improved method of using a reverse-flow mode to dislodge solids retained by filter elements to ensure rapid removal of those retained solids and in which the separation and dislodgement modes may be repeated for prolonged periods of time.

It is a further object of the present invention, in at least some embodiments, to provide a method of backwashing a hollow fibre filter which retains some of the features of the prior art, notably the use of a prior lower pressure gas to purge the lumens of liquid before using higher pressure gas to backwash the membrane but without the need to close the vessel before suddenly releasing the enclosed higher pressure. This improvement allows a simpler system, less subjected to repeated hydraulic shocks, and, in some embodiments, use of an open vessel with lowered pressure induced filtration.

Accordingly, in one broad form of the invention, there is provided a method of backwashing a plurality of hollow elongate fibres having microporous walls which have been subjected to a filtration operation wherein feed containing contaminant matter is applied to the exterior surface of said hollow fibres and filtrate (comprising that portion of the feed which penetrates the microporous walls of the fibres) is withdrawn from the ends of the lumens of the fibres, said method comprising:

(a) terminating the filtration operation by ceasing supply of feed to said exterior surface of said fibres, (b) substantially removing remaining filtrate from said lumens, (c) applying a source of fluid under pressure to said lumens so as to generate a differential pressure (or transmembrane pressure) across said microporous walls sufficient to exceed the bubble point of said microporous walls whereby said fluid under pressure passes through said walls, (d) maintaining the conditions of step (c) for a sufficient time to cause substantial portions of contaminant matter lodged within and/or on said walls to be dislodged, (e) recommencing the filtration operation by introducing said supply of feed to said exterior surface of said fibres.

Preferably step (b) is effected by applying pressure to said remaining filtrate whereby said remaining filtrate is passed in a reverse direction through said walls from a filtrate side to a feed side.

As an alternative preferred form, step (b) is effected by allowing said remaining filtrate to drain out of said lumens of its own volition.

In a particular form of said alternative preferred form, step (b) is effected by applying pressure to said remaining filtrate whereby said remaining filtrate is urged from said lumens.

In a particular preferred form of the invention, step (b) of draining the lumens of any remaining filtrate additionally includes the step of draining any remaining feed away from the exterior surface of the fibres whereby substantially no feed is in contact with the exterior surface of the fibres when the compressed air is applied.

After step (d) and prior to step (e) the method may further include the step of rewetting said fibres.

After step (d), the method may further include the step of washing dislodged contaminant matter away by the application of a flow of liquid over of the surface of the walls of the fibres.

Preferably, the fibres are arranged in bundles and housed within an elongate shell so as to form a cartridge. The fibres may be aligned along the longitudinal axis of the cartridge with the ends of the lumens of the fibres are in fluid communication with the ends of the shell.

In a particular mode of operation of the cartridge as a filter, the feed is introduced adjacent a first end of the shell and removed from the opposite end of said shell. This is termed a cross-flow mode of operation.

In an alternative particular mode of operation of the cartridge, the feed is introduced into the shell in a manner whereby only that portion of said feed (the filtrate) which permeates the walls of said fibres is removed from said cartridge through said lumens. That is, concentrated food is not removed from the shell. This is termed a dead-end mode of operation.

The step of draining the external surface of said fibres may be performed by allowing remaining feed to drain away under the influence of gravity.

Alternatively, the step of draining said external surface of said fibres may be performed by applying a positive influence to the remaining feed, for example in the form of low pressure compressed air.

According to another aspect of the invention there is provided a method of concentrating the solids of a liquid suspension within a vessel consisting of:

(i) applying the liquid suspension under pressure within a vessel to the outer surface of elastic, microporous, hollow fibres or tubular filter elements to induce and sustain filtration through the membrane walls wherein:

(a) some of the liquid suspension passes through the walls of the fibres to be drawn off as clarified liquid or filtrate from the hollow fibre lumens, and (b) at least some of the solids are retained on or in the hollow fibres or otherwise as suspended solids within the liquid of the vessel enclosing the tubular filter elements, (ii) dislodging the retained solids from the fibres by applying a dislodging medium through the lumens after opening the vessel to atmospheric pressure.

The retained solids may be dislodged by applying a pressurised liquid which passes through substantially all the hollow fibre membrane pores followed by a pressurised gas which follows the liquid through the larger pores to stretch those pores to dislodge any solids retained in those pores and to scour the external walls of the fibres to displace the dislodged and scoured solids from the hollow fibres into the bulk liquid within the vessel.

The retained solids may also be dislodged from the fibres by either closing the exposure of the lumens to downstream filtrate pressures and opening the vessel to atmospheric pressure and then applying a very sudden pulsed pressure rise (water-hammer shock) to the liquid in the lumens, or by introducing a reverse flow of a prepared liquid down the lumens and into the fibre walls before applying a very sudden pulsed pressure rise as described above. The prepared liquid can be held in a separate reservoir and subjected to gas at a higher pressure so that when delivered into the hollow fibre lumens it is super-saturated with dissolved gas, and application of the very sudden pulsed pressure serves to release this gas suddenly from solution in its liquid.

In one form of the invention, the application of the pressurised gas is initially conducted so as to displace liquid within the hollow fibre lumens through the hollow fibre membrane with gas at a pressure below the bubble point of the pores of the fibres. Subsequent admission to the hollow fibre lumens of gas at a pressure substantially higher than the bubble point of the pores drives liquid retained in the membrane pores outwards allowing gas in the lumens to follow the liquid through the fibre walls to provide effective cleaning and scouring even at the most distant point from the lumen inlet thus reducing the natural tendency in a liquid only reverse flow backwash towards preferential washing of pores near the lumen inlet.

Preferably,the method of the invention is carried out as a continuous process utilising a repetitive cycle of solid accumulation and solid discharge. It will be appreciated that when using compressed gas to reverse the flow of liquid through the walls of the fibres as described above in an ideal hollow fibre, the compressed gas should follow the liquid through all the pores, however, in reality some of the pores are smaller and will successfully resist displacement of the liquid therein by the expanding gas.

Application of filtrate-side vacuum or vessel-side pressure to provide resumption of the flow of feed suspension through the fibres after the solids discharging step may be delayed for sufficient time to allow the expanded pores to recover to their original size so that over-sized particles from the feed suspension will not be able to pass into or through the pores while they remain enlarged.

According to another aspect of the invention there is provided a concentrator for recovering fine solids from a liquid feed suspension comprising:

(i) a vessel which can be exposed to atmospheric pressure, (ii) a plurality of elastic, hollow, microporous, polymer fibres within the vessel, such fibres being assembled into at least one bundle, (iii) means for applying a vacuum to the lumens of the hollow fibres, or pressure to the vessel, (iv) means for withdrawing clarified liquid from the fibre lumens, and (v) means for applying gas pressure at two pressures in sequence to the liquid in the fibre lumens and walls while the vessel is exposed to atmospheric pressure to effect firstly a discharge of liquid in the lumens through the fibre walls, and secondly a transmembrane cleaning of the fibres, the higher (second) pressure applied by the gas onto the liquid being sufficient to stretch substantially all of the pores of the fibres, and the higher pressure of the gas also being sufficient to ensure that the gas will displace liquid and follow it through the larger pores of the fibres to dislodge any solids retained therein; and for the emerging gas to scour the external walls of the fibres and displace the removed solids into the bulk liquid in the vessel.

The concentrator may also include means for temporarily transferring the liquid contents of the vessel to a separate holding vessel during backwash operations.

The concentrator may also include means for raising the plurality of elastic, hollow, microporous polymer fibres above the liquid within the vessel during backwash operations.

In other forms of the invention at least part of the gas backwash may be carried out whilst the fibres are temporarily not immersed in the liquid feed suspension.

According to yet another aspect of the invention there is provided a method of concentrating the solids of a suspension in a liquid comprising:

(1) applying the liquid containing the solids to the outer surface of elastic, microporous, hollow fibres or tubular filter elements located within a vessel whilst applying a relatively lowered pressure to the filtrate side of the fibres or elements to induce and sustain passage of said liquid through the walls of the fibres or filter elements whereby;

(a) the liquid passes through the walls of the fibres to be drawn off as filtrate from the lumens of the fibres or elements, and (b) the solids are retained on or in the fibres or filter elements or otherwise as suspended solids within the liquid in the vessel, (ii) periodically dislodging the retained solids from the fibres.

According to a further aspect of the present invention there is provided a method of dislodging contaminant matter lodged within and on the walls of microporous fibres comprising a microporous filter; said method comprising agitating said fibres so as to shake free said contaminant matter.

Preferably, the fibres are immersed in a liquid during the agitating step. The fibres may be located in a tank which is open to atmospheric pressure.

BRIEF DESCRIPTION OF THE DRAWINGS

The invention will now be described with reference to the accompanying drawings wherein:

FIG. 3 is a diagramatic view of the steps of the backwash procedures according to a first embodiment of the invention, FIG. 4 is a diagramatic view of the steps of the backwash procedures according to a second embodiment of the invention, FIG. 6 is a valve timing diagram showing relative valve opening and closing times for the valves illustrated in the assembly of FIG. 5 in order to effect the method illustrated in FIG. 4.

DETAILED DESCRIPTION OF PREFERRED EMBODIMENTS OF THE INVENTION

Figure 1A:
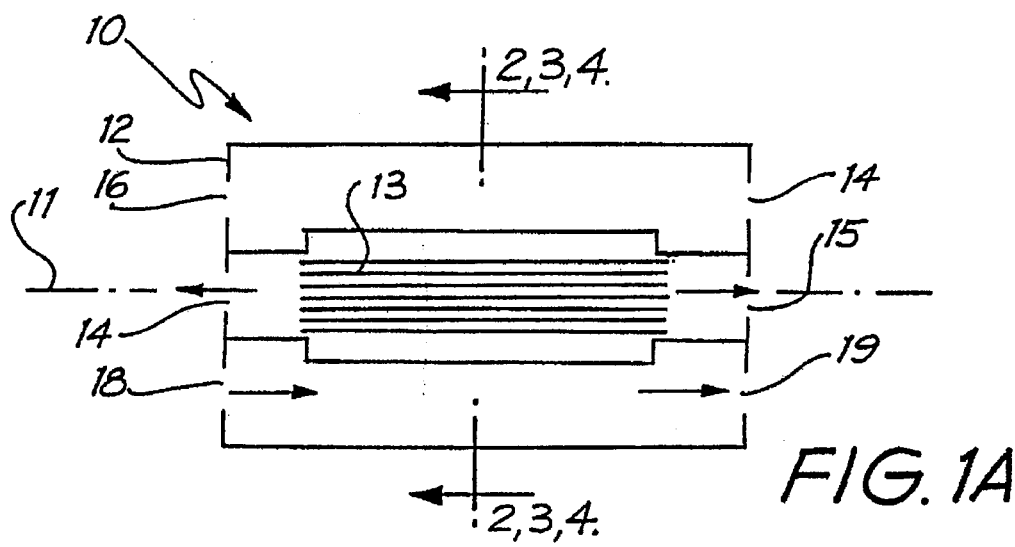
FIG. 1A is a diagramatic side sectional view of a mocroporous filter cartridge operating in a cross flow mode of the prior art.
Figure 1B:
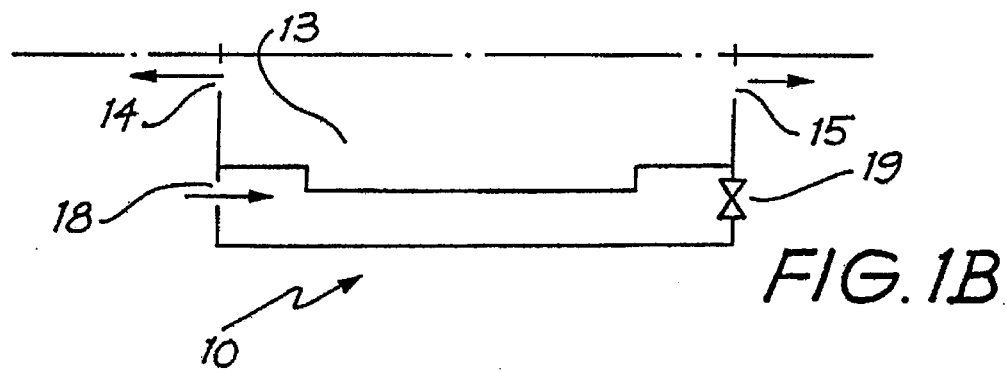
FIG. 1B is a diagramatic side sectional view of a microporous filter cartridge operating in a dead end mode of the prior art.

With reference to FIGS. 1A and 1B a known filter cartridge structure 10 is illustrated operable in two modes termed "flow through" as per FIG. 1A and "dead end" as per FIG. 1B. Cartridge 10 of FIG. 1B is identical in construction to that of cartridge 10 of FIG. 1A hence only one half of the symmetrical side section view of cartridge 10 is shown in respect of the dead end mode of operation in FIG. 1B.

The construction of the filter cartridge 10 is essentially symmetrical about its longitudinal axis 11 and comprises an outer shell 12 enclosing a bundle of fibres 13.

The ends of the lumens of the fibres comprising the bundle of fibres 13 are in fluid communication with entry/exit ducts 14, 15 located respectively at opposed ends 16, 17 of the cartridge 10

Shell entry/exit ports 18, 19 are located at respective ends 16, 17 of the shell 12. Ports 18 and 19 are in fluid communication with the interior of the shell and therefore in fluid communication with the exterior surfaces of the walls of the fibres comprising the bundle of fibres 13.

In this instance, each fibre of the bundle of fibres 13 is made of polypropylene, has an average pore size of 0.2 microns, a wall thickness of 200 microns and a lumen diameter of 200 microns. There are 3,000 hollow fibres in the bundle 13 but this number as well as the individual fibre dimensions may be varied according to operational requirements.

The filter cartridge 10 of FIG. 1A acts as a microporous filter in the flow through mode when feed is introduced into port 18 whereby the feed comes in contact with the exterior surfaces of the fibres comprising the bundle 13. The walls of the fibres are microporous thereby allowing essentially particle free feed fluid to flow through the walls and into the lumens of the fibres as filtrate which is withdrawn from either or both ports 14, 15. Excess feed is withdrawn through port 19.

The operation of the cartridge 10 in FIG. 1B in the dead end mode is similar to that described above in respect of FIG. 1A save that port 19 is kept closed (or does not exist at all). Hence feed which enters port 18 remains within the shell 12 save for that portion which passes through the walls of the fibres of the bundle 13 as filtrate for removal through either or both of ports 14, 15.

The description which follows relates to operation in the dead end mode of FIG. 1B, however, the same principles and overall characteristics apply in relation to embodiments of the invention when the cartridge 10 is operated in the flow through mode of FIG. 1B.

In order for the cartridge 20 to operate as a filter it is necessary that there be a pressure differential across the walls of the fibres such that the feed present on the outside of the walls of the fibres is caused to pass through the walls and into the lumens of the fibres.

This pressure differential can be created in a "positive" manner by applying the feed under pressure by means of a pump or the like to the exterior surface of the walls of the fibres.

Alternatively, the pressure differential across the walls can be created in a "negative" manner by firstly priming the assembly so that liquid is present on both the exterior surface of the walls of the fibres and also within the lumens followed by actively pumping away the liquid from within the lumens. This mode of operation is henceforth termed "lowered pressure" induced filtration wherein a vacuum pump or the like is utilised to actively draw away liquid within the lumens of the fibres whereby the requisite pressure differential across the walls of the fibres is created so as to cause feed to pass through the walls of the fibres from the shell side to the lumen side.

Both "positive feed" and "lowered pressure induced" methods of creating the pressure differential across the walls of the fibres will be described in embodiments of the invention to follow.

When the cartridge 10 is operated as a filter, solids in suspension in the feed which enters the shell 12 become lodged within and on the surface of the walls of the fibres comprising the bundle 13. The amount of solids lodged increases with operational time, one consequential effect being that for a given feed pressure into port 18, the flow rate or flux of filtrate through the walls of the fibres comprising the bundles 13 decreases over the operational time.

Figure 1C:
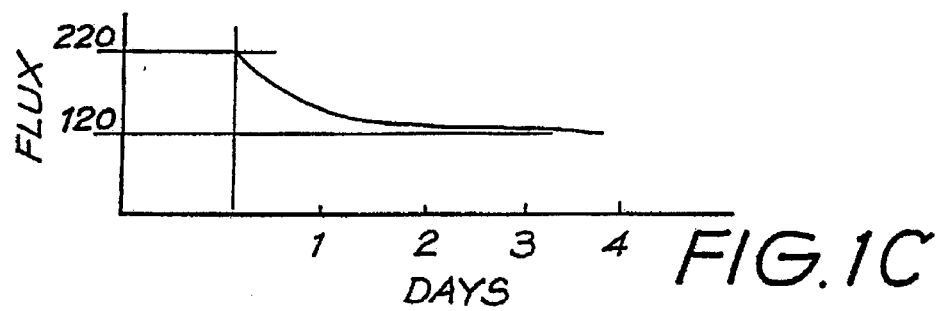
FIG. 1C is a graph of flux against time for a filter cartridge operated in accordance with the prior art procedures.
Figure 1D:
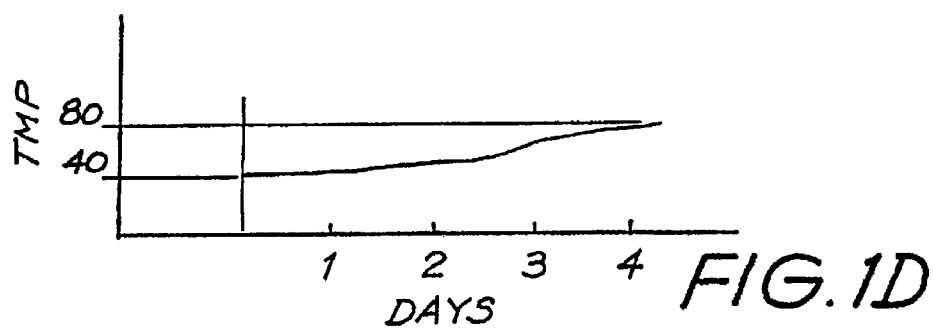
FIG. 1D is a graph of trans membrane pressure against time for a filter cartridge operated in accordance with the prior art procedures.

The graphs of FIGS. 1C and 1D show the practical effect of this behaviour on the operational parameters of the filter cartridge over an exemplary three day period starting from a condition where the filter is completely clean. In practice, this can be effected by a chemical clean followed by a fewer of the fibres where the fibres are comprised of hydrophobic material.

It can be seen from FIG. 1C that the flux degrades relatively rapidly initially and then tends to stabilise at a lower value. Correspondingly, as can be seen in FIG. 1D, the transmembrane pressure (TMP) gradually rises, eventually becoming unacceptably high to the extent that a chemical clean or equivalent must be initiated.

An essential requirement to obtain the characteristic shown in the graphs of FIGS. 1C and 1D is that a "backwash" procedure be carried out at regular intervals. In the graphs of FIGS. 1C and 1D, the backwash procedure was carried out every 20 minutes with the backwash procedure itself taking approximately one minute. The sample points were taken approximately one minute after each regular backwash was completed.

Without the regular backwash procedure, the performance of the cartridge would degrade unacceptably quickly for practical use in commercial applications such as sewage filtration and the like.

Figure 2:
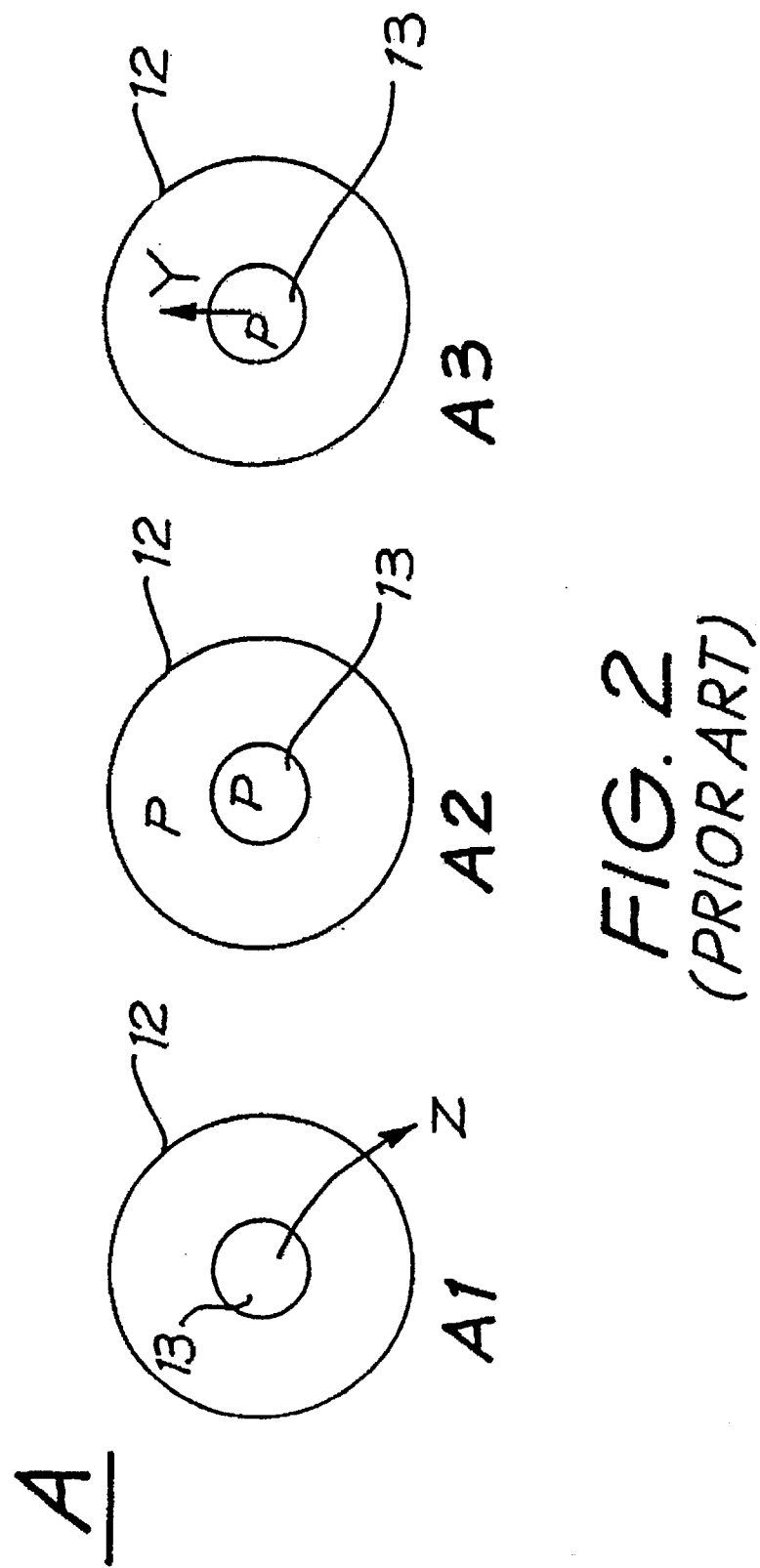
FIG. 2 is a diagramatic view of the steps of prior art backwash procedures for closed shell, pressure fed filter cartridges.

FIGS. 2, 3 and 4 comprise a series of cross-sectional views of cartridge 10 of FIG. 1A and shows steps of the prior art backwash procedure (FIG. 2A) as well as the steps of a backwash procedure according to first (FIG. 3) and second (FIG. 4) embodiments of the present invention.

With reference to the prior art backwash steps in FIG. 2, the prior art backwash steps comprise (on the assumption that feed has ceased to be fed to the shell 12) firstly draining remaining filtrate from the lumens of the bundle of fibres 13 as indicated by arrow Z in step A1, then pressurising both the interior of the lumens and the interior of the shell 12 Generally with a pressure source of compressed air whereby the entire region enclosed by the shell 12 is pressurised to s pressure between approximately 300 and 600 kPa as indicated by P in step A2.

This is followed by step A3 where the source of pressure is maintained to the lumens of the bundle of fibres 13 as indicated by P but the source of pressure is suddenly removed from the balance of the shell 12 as indicated by arrow Y whereupon a dramatic pressure differential (termed negative TMP) occurs across the walls of the fibres comprising the bundle of fibres 13 with the Gradient being from high pressure on the lumen side of the walls to low pressure on the shell side of the walls.

The introduction of the pressure Gradient across the walls is best described as explosive and causes sudden dislodgement of trapped particulate matter from the pores of the microporous material comprising the walls of the fibres of the bundle 13 into the feed volume of the shell 12 from which the particulate matter can be swept by appropriate passage of liquid therethrough, for example by the passage of liquid longitudinally through the shell structure from port 18 and out through port 19.

This prior art method of backwash shown schematically in FIG. 2 is characterised by the relatively high pressurisation step A2 which requires that the bundle of fibres 13 be encased within a totally enclosed pressurisable structure. Furthermore, the pressurisable structure is subjected to repeated pressurisation steps A2 every few tens of minutes throughout its working life. The cyclic pressurisation/ depressurisation introduces fatigue problems with consequential shortening of the otherwise serviceable life of the structure as a filter cartridge. The prior art backwash method is also characterised by the requirement for fast acting, high performance valves to ensure the explosive nature of the transition from steps A2 to A3. The prior art method described above is to be contrasted with methods of backwash according to first and second embodiments of the present invention described with reference to FIGS. 3 and 4.

In FIG. 3, a first embodiment of a backwash method according to the invention is shown wherein step B1 comprises draining the lumens of the bundle of fibres 13 as indicated by arrow Z in a manner similar to that of step A1. Step B1 is immediately followed by step B2 which comprises the pressurisation of the lumens of the bundles of fibres 13 by a high pressure source of air ideally in the range 300 to 600 kPa as indicated by P wherein a pressure differential is caused across the walls of the fibres comprising the bundle 13 sufficient to cause at least some of the pressurised air to pass through the walls of the fibres from the lumen side to the shell side as indicated by arrow X. This passage of air through the walls dislodges entrained particulate matter from within the walls of the fibres and transports it into the feed volume portion of the shell interior from which this particulate matter can be swept.

A significant distinguishing feature as between the backwash methods according to FIG. 2 as compared with FIG. 3 is the omission from FIG. 3 of a step corresponding to step A2.

FIG. 4 illustrates a second embodiment of a backwash method according to the invention wherein step C1 is similar to step B1 but with the additional feature of causing the feed volume of the shell to be drained of remaining feed prior to step C2 as indicated by arrow W. In a particular preferred form of this embodiment, the step of draining the feed portion of the shell is carried out at the same time as the lumens are drained of remaining filtrate. In particular preferred forms of the embodiment, this draining can be aided by the introduction of relatively low pressure compressed air to speed up the draining process from the feed portion of the shell, the lumens or both.

Step C1 is followed by step C2 which is identical to step B2 described above. It will be noted that the method described with respect to FIG. 4 is distinguished from the prior art of FIG. 2 in the same manner as the method of FIG. 3 in that the pressurisation step A2 is not present in the method of FIG. 4.

A particular consequence of the omission of the pressurisation step A2 is that the life-shortening pressurisation/ depressurisation cycling of the filter cartridge shell 12 is removed.

In relation to the second embodiment described in FIG. 4 it is postulated that the backwashing procedure according to the invention is particularly enhanced by removing remaining feed from the feed volume within the shell 12 prior to the blow back step of step C2 on the basis that the remaining feed tends to impede the creation of a high pressure gradient across the wall profile (negative TMP). Removal of the excess feed removes this impediment thereby enhancing the efficiency of the particle dislodgement effect of the blow back step C2.

Figure 5:
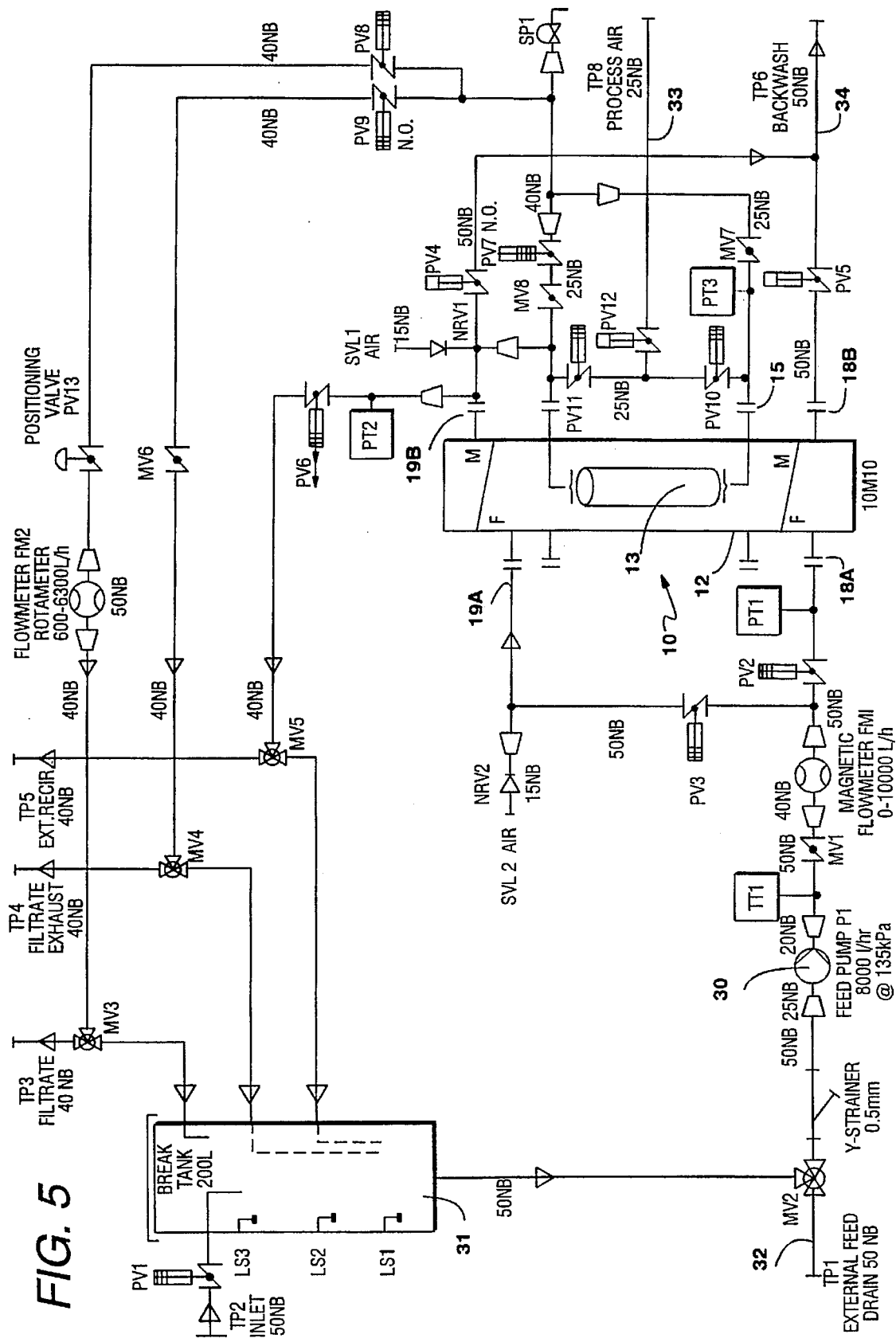
FIG. 5 is a schematic, block diagram of a filter assembly including the cartridge of FIG. 1 and adapted to backwash according to the method illustrated in FIG. 3 or FIG. 4.

FIG. 5 illustrates a pipe and valve interconnection diagram of an experimental example of a pressure fed, enclosed shell filter which can be operated by appropriate valve sequencing to achieve the method of either the first embodiment (steps B) or the second embodiment (steps C).

FIG. 6 is a valve timing diagram for the valves nominated in FIG. 5 so as to achieve a backwash according to the steps of the second embodiment steps C.

The operation of the example of FIG. 5 sequenced according to the valve timing diagram of FIG. 6 may be described as follows.

The assembly of FIG. 5 comprises a single cartridge 10 which includes fibre bundle 13, the lumens of which are in fluid communication with lumen ports 14, 15.

The shell 12 which encloses the fibre bundle 13 includes feed ports 18A, 18B at one end and feed ports 19A, 19B at an opposite end as illustrated.

During filtration operation a pump 30 supplies feed either from break tank 31 or from external feed source 32 to the interior of shell 12 by way of ports 18A and/or 19A (dependant on the condition of valve PV3). Filtrate can then be withdrawn via filtrate ports 14, 15.

In order to conduct a backwashing cycle according to the second embodiment (steps C) a valve sequencing operation is performed in accordance with the timing diagram of FIG. 6 wherein the steps are generally as follows.

Firstly feed to the cartridge 10 is shut off by stopping pump 30 and by ensuring all valves are closed including valves PV2 and PV3.

A lumen drain down sequence and shell drain down sequence is commenced by pressurizing the shell and the lumens with low pressure air by opening solenoid valves SVL1 and SVL2. Valve PV9 is opened to allow return of filtrate drained from the lumens to break tank 31. Valve PV5 is opened to allow draining away of feed from within shell 12 via port 18B to an external location (not shown).

The blowback sequence is then commenced by leaving solenoid valves SVL1 and SVL2 on and, in addition, opening valves PV4 and PV7 followed by the simultaneous opening of high pressure air supply valves PV10, PV11 and PV12 which causes high pressure air from process air supply 33 to enter the lumens of the fibre bundle 13, pass through the walls thereof and into the interior of shell 12 with air and any remaining liquid being exhausted from feed ports 18B and 19B.

This condition lasts fop only 1 second following which feed is reintroduced to the shell 12 by turning on pump 30 and opening supply valve PV2 together with the closing of valve PV5 whereby feed is introduced via port 18A and exits the cartridge 10 via port 19B in a cross-flow mode.

Actual blowback is ceased by closing valves PV10, PV11 and PV12, but with a "shell sweep" mode being maintained for approximately 18 seconds by continuing operation of the cartridge 10 in cross flow mode with any remaining sediment within the interior of shell 10 being exhausted via port 19B to backwash exit 34.

This completes the backwash sequence. If appropriate a fewer sequence can follow, otherwise filtration is recommended.

The arrangement of FIG. 5 or equivalents thereof has been used to conduct a series of comparative experiments wherein the cartridge 10 of FIG. 5 is operated continuously over a number of days utilising, on separate occasions, the backwash method of the prior art steps A, the backwash steps according to the first embodiment steps B and the backwash steps according to the second embodiment, steps C.

All experiments were conducted with feed adjusted so as to provide an average transmembrane pressure (TMP) of the order of 80 kPa during the trial periods.

Figure 7:
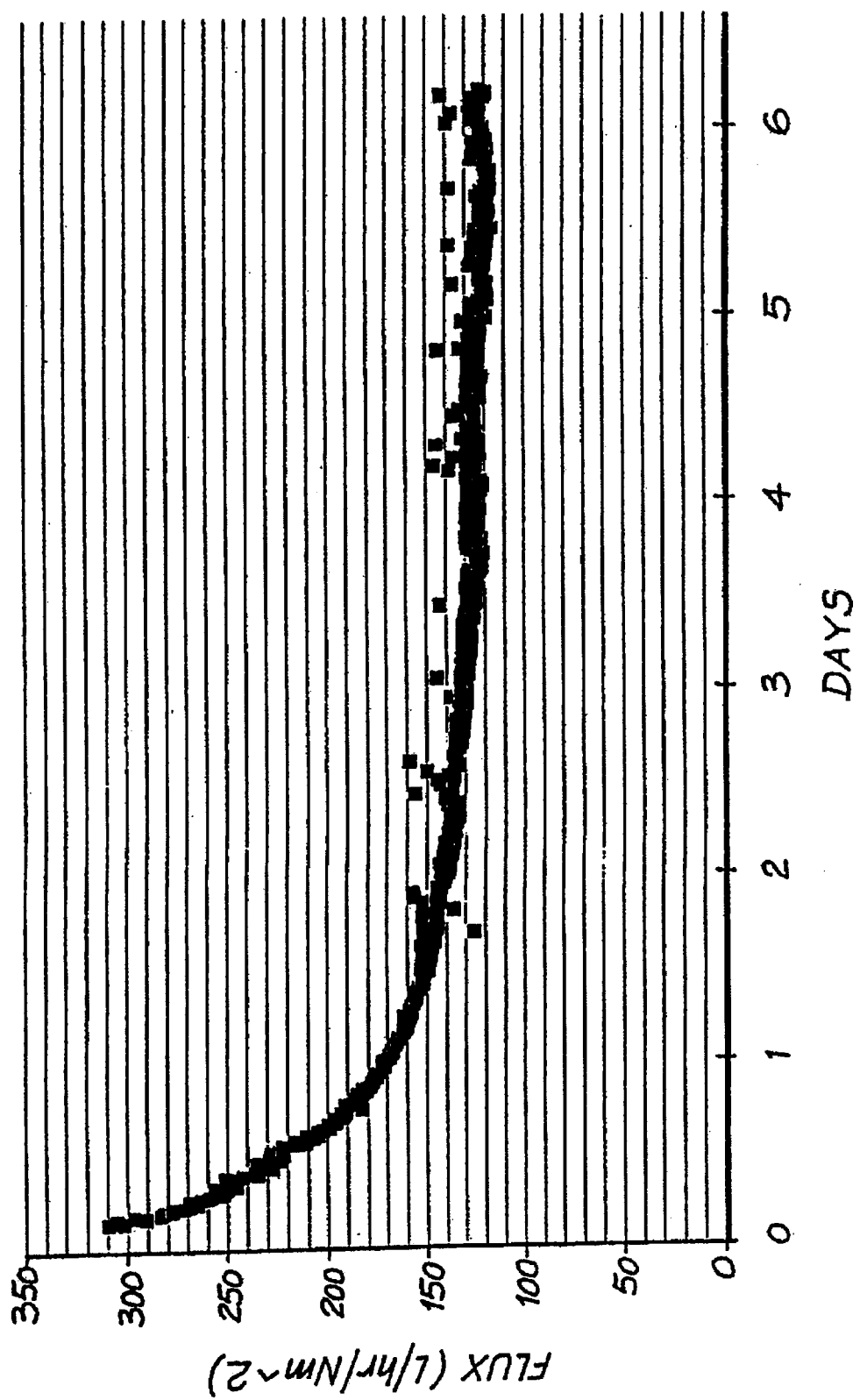
FIG. 7 is a flux versus time diagram for a prior art method of backwash according to steps A of FIG. 2.
Figure 8:
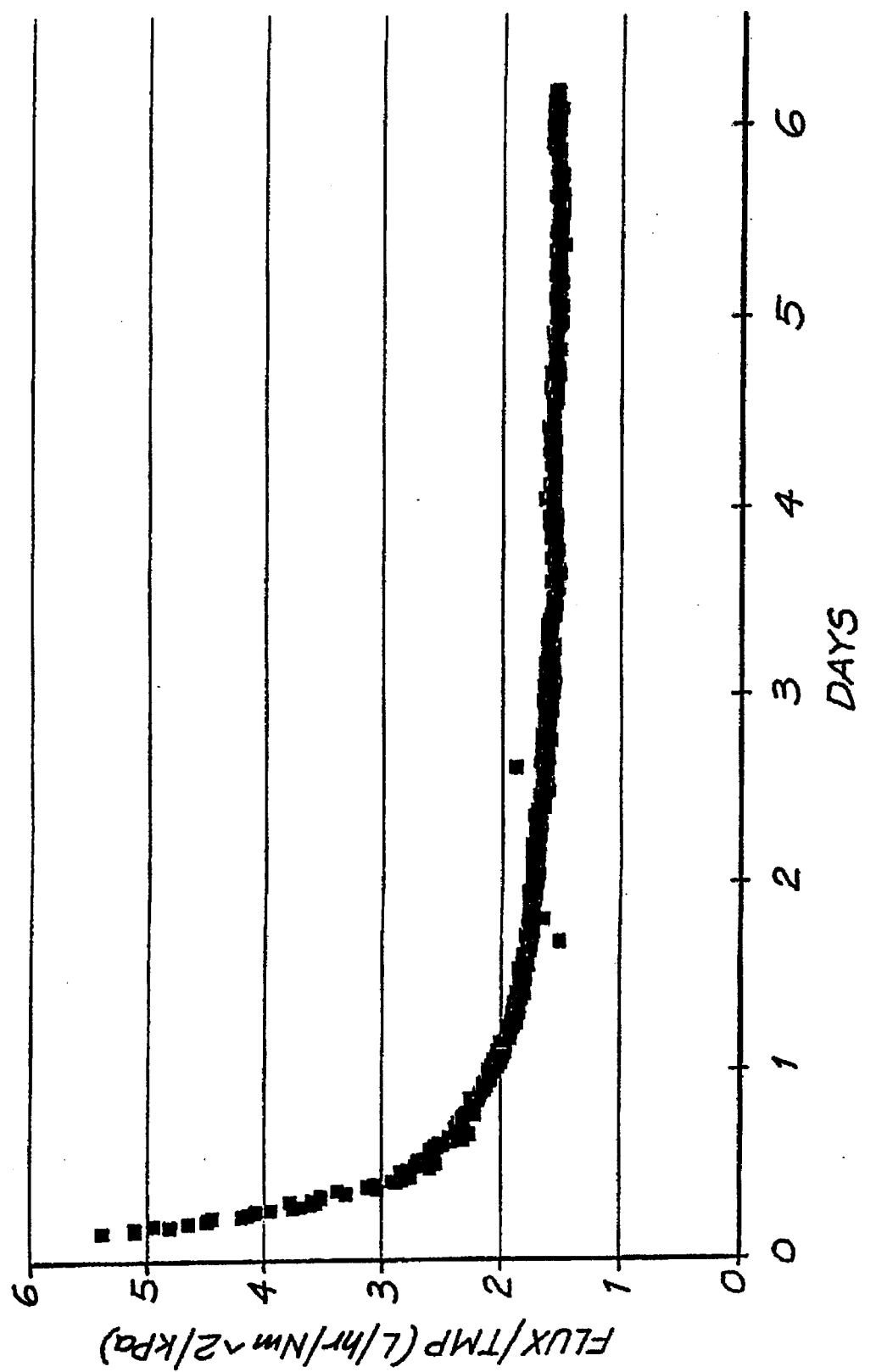
FIG. 8 is a normalised flux/TMP versus time diagram corresponding to FIG. 7.

FIGS. 7 and 8 illustrate the results for the filtration process utilising the prior art backwash method of steps A.

An installation such as that illustrated and described with respect to FIG. 5 was operated so as to include the prepressurisation steps A described previously in FIG. 2. Values of flow (termed flux in units of litres per hour per $Nm^2$) was sampled at a fixed time after each backwash was completed over a period of six days and the results graphed as shown in FIG. 7. It can be seen that the initially clean installation performs with a flux value greater than 300 litres per hour per $Nm^2$. However, despite the regular backwashings, this rate degrades to between 100 and 150 litres per hour per $Nm^2$ after approximately two days of operation and stabilises within this range.

FIG. 8 utilizes the same set of experimental results as FIG. 7 but is "normalised" by dividing the flux values by transmembrane pressure (TMP) values so as to compensate for and render the experimental results somewhat less dependant upon or sensitive to non-linearity in the relationship between flux and TMP.

Figure 9:
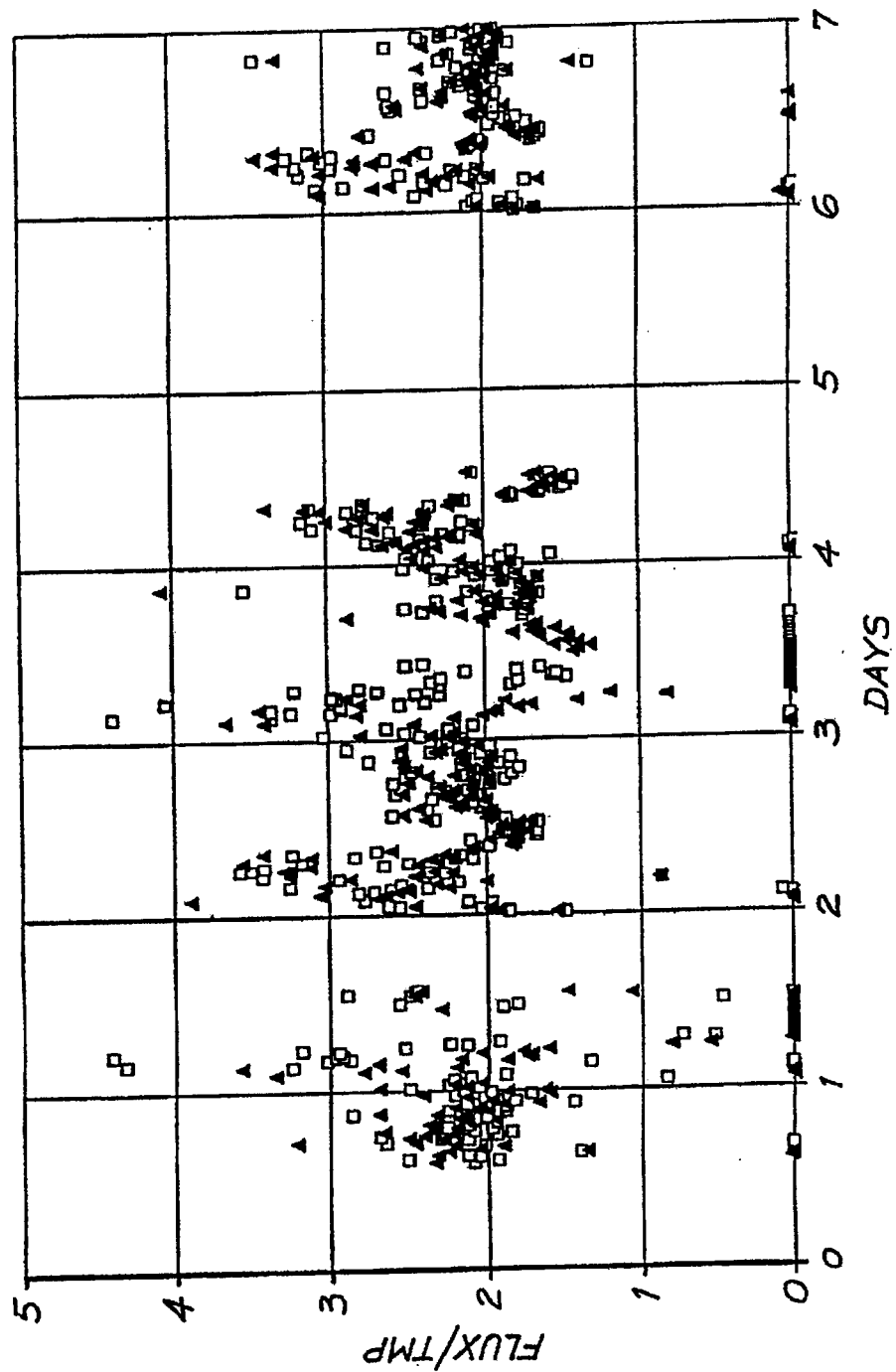
FIG. 9 is a normalised flux/TMP versus time diagram for a filtration system operated utilising a backwash method of a first embodiment of the invention according to steps B of FIG. 2.

FIG. 9 illustrates corresponding results when utilising the backwash steps according to the first embodiment, steps B.

In this diagram flux divided by TMP is graphed against an experimental duration of seven days with experimental results both for operation in the prior art mode (Steps A) and in the Steps B mode superposed on the one diagram for direct comparison. The results were taken at fixed time intervals, not synchronized with the ends of backwashing cycles and therefore some results reflect sampling during backwash or other non filtration operations. It can be seen from FIG. 9 that both the steps A operation sample points and the steps B operation sample points are clustered together to the extent that the conclusion can be drawn that there is no degradation of performance when operating in steps B mode as compared in steps A mode.

Figure 10:
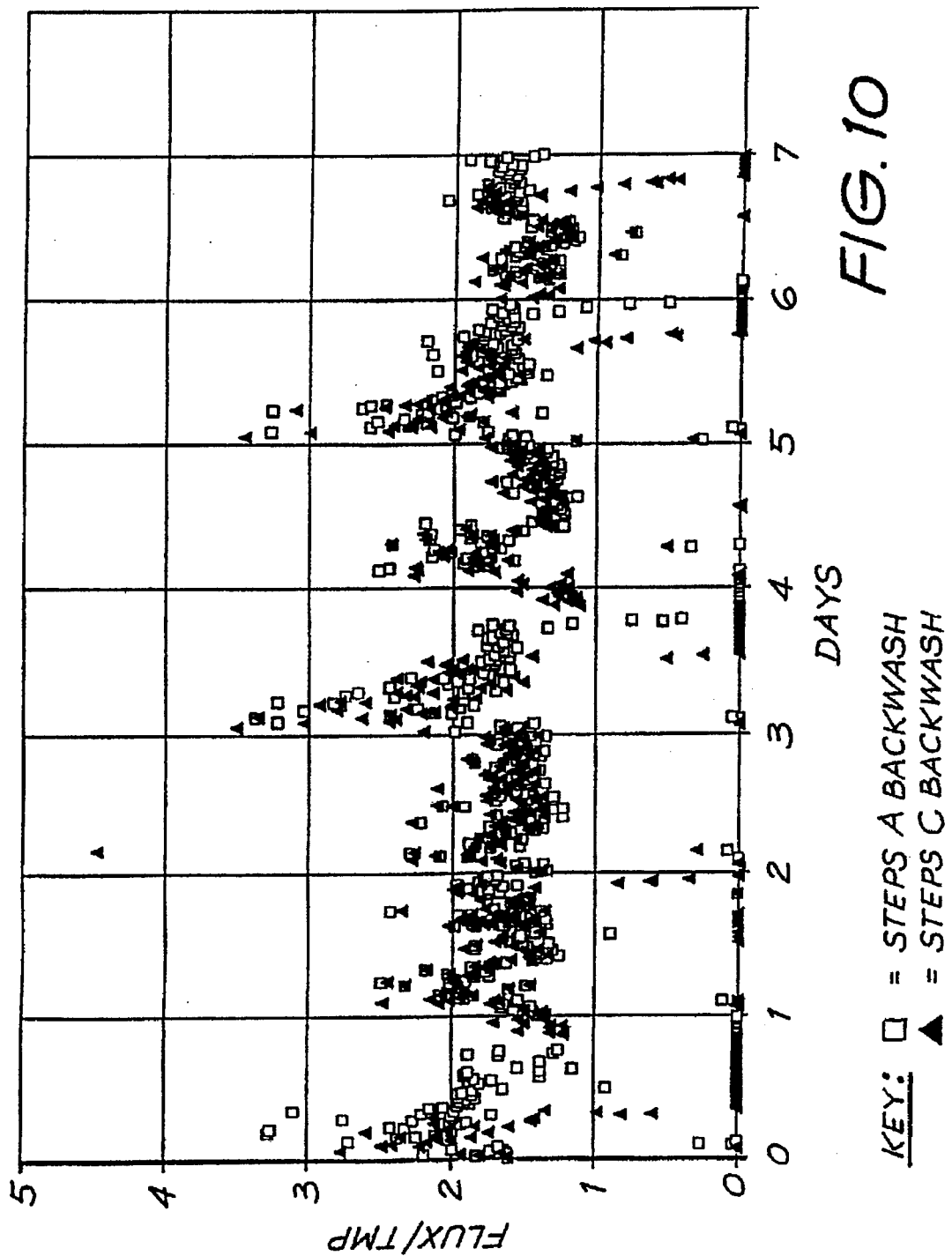
FIG. 10 is a normalised flux/TMP versus time diagram for a filtration system operated utilising a backwash method according to a second embodiment of the invention incorporating steps C of FIG. 2.

FIG. 10 shows a similar set of superposed experimental results, in this case of a steps A operation as compared with a steps C operation. Again the clustering of the superposed results indicates no degradation in operation when operating in steps C mode.

Figure 11:
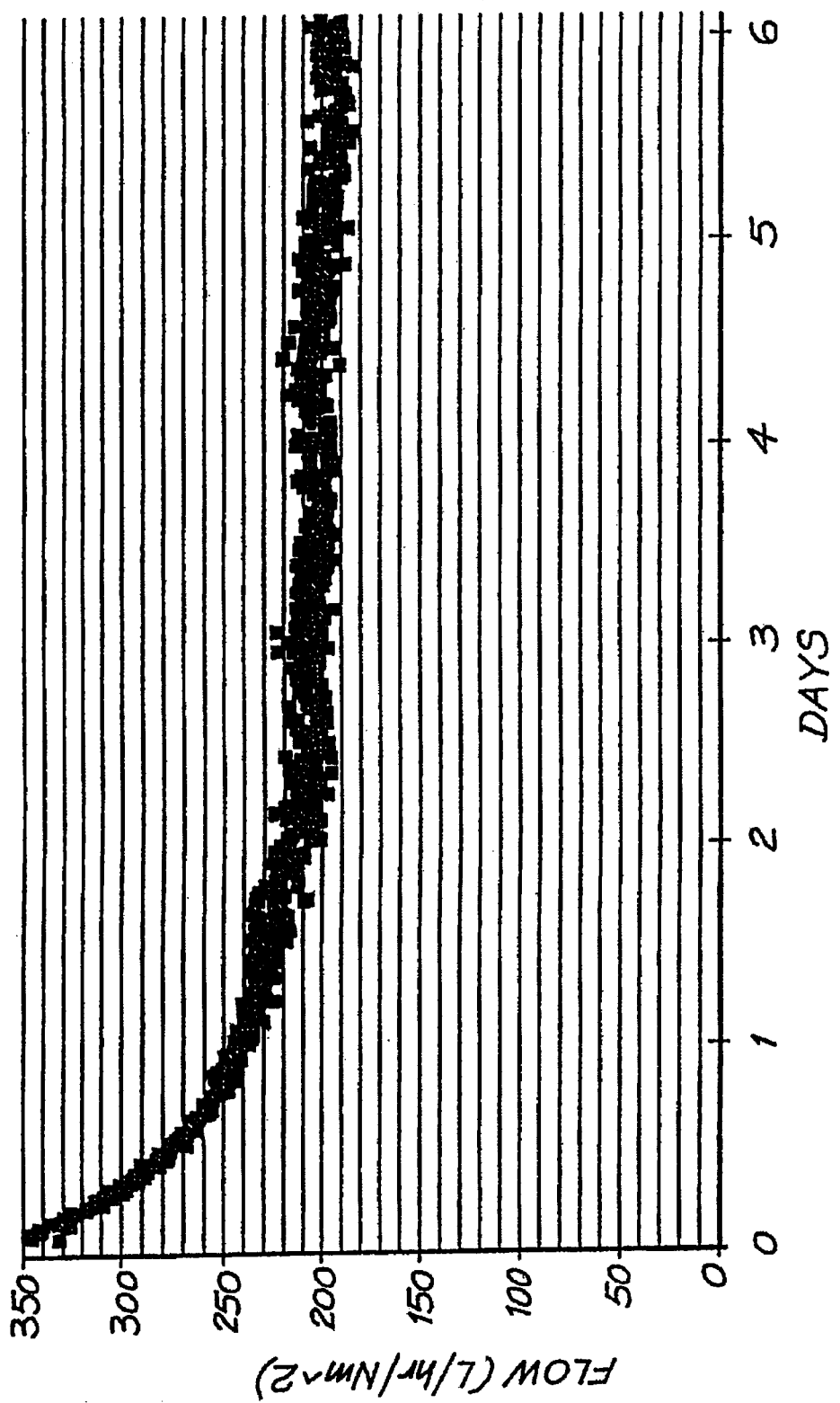
FIG. 11 is a flux versus time diagram for a filter cartridge again operated using the backwashing method according to a second embodiment of the invention, steps C of FIG. 2 and, FIG. 12 is a normalised flux/TMP versus time diagram corresponding to FIG. 11.

FIG. 11 shows the results of a further experiment of an installation operated in steps C mode and sampled in a manner which allows direct comparison with the graph of FIG. 7 (for steps A mode of operation). In this case the obtaining of sample data was synchronised with the end of backwashing cycles so that a sample was taken at a fixed time after normal operation had commenced following backwash. Hence these results shown very little scatter. When comparing FIGS. 7 and 11 it can be seen that the steps A mode of operation of FIG. 7 stabilizes at a flux value of around 130 whereas the steps C operation illustrated in FIG. 11 stabilizes at a flux value of around 200. The comparison in this case shows a clear improvement in the long term trend utilizing the Steps C mode of backwash as compared with the steps A mode of backwash.

Figure 12:
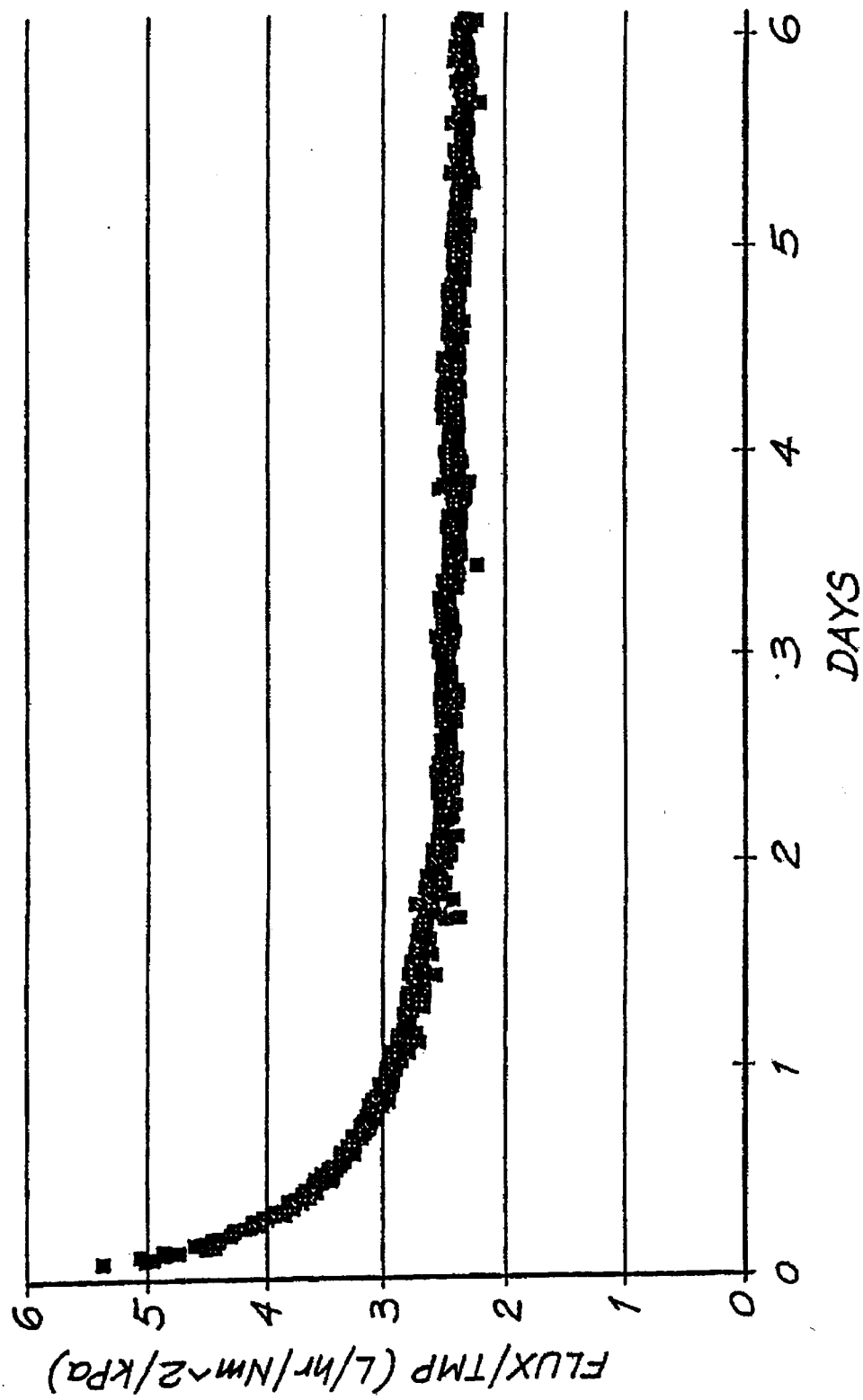

FIG. 12 illustrates the same data as that obtained for FIG. 11, but normalised in the manner previously described for direct comparison with FIG. 8. Again it will be noted that the steps A operation of FIG. 8 stabilises at a flux/TMP value of around 1.5 whereas the corresponding stabilisation value in FIG. 12 is around 2.3.

Additional embodiments of inventions will now be described with reference to FIGS. 13 to 21. Whilst the majority of these figures relate to open shell configurations, most often with filtrate withdrawal effected by actively lowering pressure on the lumen side of the fibres, the modes of backwash described in relation thereto are not to be taken as necessarily limited to such configurations.

Figure 13:
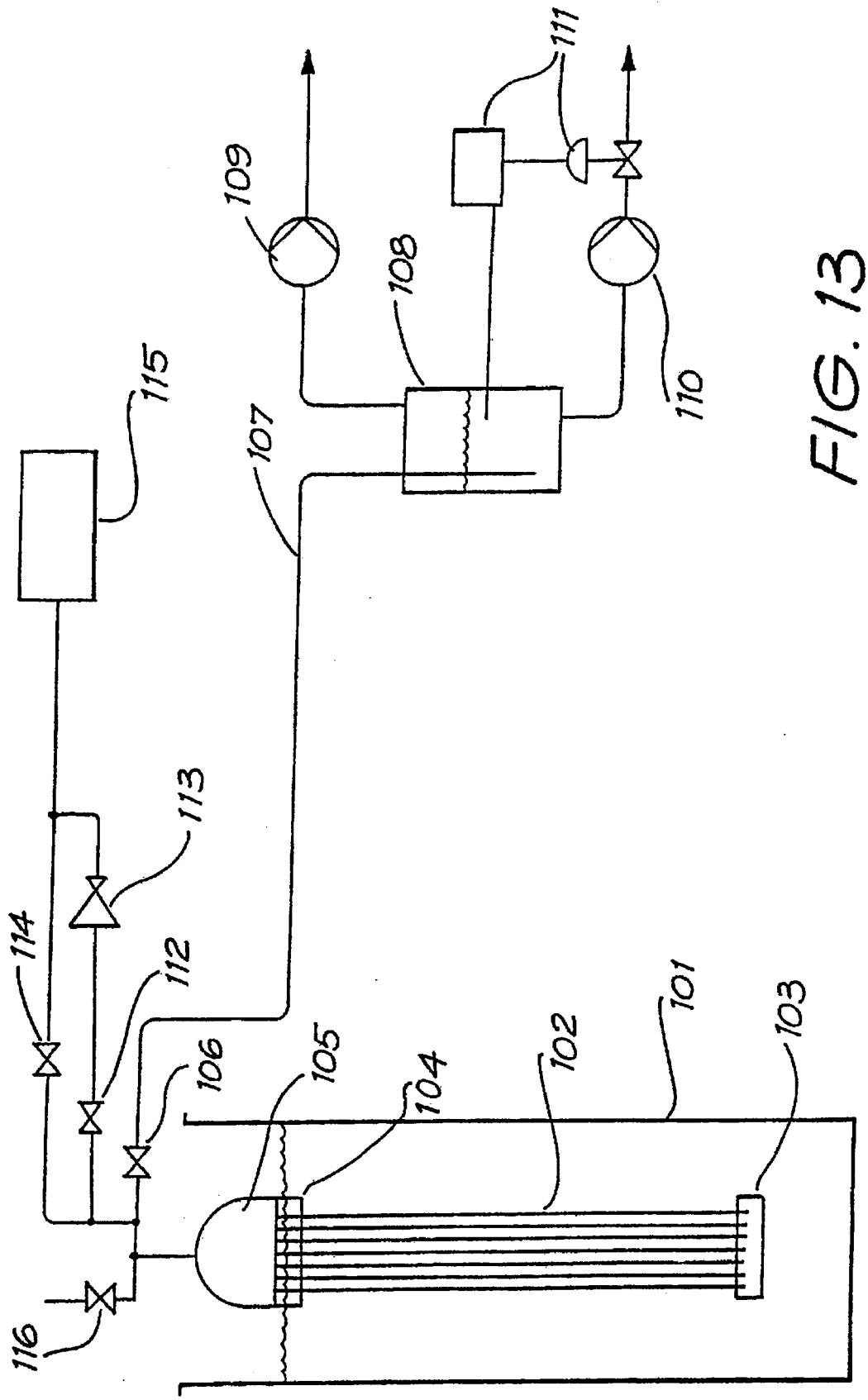
FIG. 13 is a schematic diagram of a concentrator employing lowered pressure driven induced filtration and a gas pressure backwash system according to a third embodiment of the invention.

The hollow fibre concentrator shown in FIG. 13 consists of a bundle of hollow fibres 102 sealingly encased within cast resin blocks 103 at their bottom and 104 at their top such that all lumens are sealed at their bottom ends, but all open at their top ends. The hollow fibre bundle 102 is completely submerged in liquid containing suspended solids contained in the open-top tank 101.

The upper resin block 104 is sealingly connected to filtrate chamber (or header) 105. Chamber 105 is connected to filtrate receiver tank 108 by pipe 107 having a valve 160. A vacuum pump 109 and filtrate withdrawal pump 110 are connected to the receiver tank 108. The rate of liquid withdrawal from receiver tank 108 is controlled by level controller 111.

The concentrator shown in FIG. 13 utilises a gas pressure backwash system employing two pressure levels. Compressed gas at the higher pressure supplied from source 115 is delivered to filtrate chamber 105 by opening of valve 124. Compressed gas is reduced by pressure reducing and regulating valve 113, and supplied to filtrate chamber 105 when valve 112 opens, and valves 106, 114 and 116 are closed. When only valve 116 is open, the pressure in filtrate chamber 105 is one atmosphere.

During filtration, vacuum pump 109, and filtrate withdrawal pump 110 operate with valve 106 open and valves 112, 114 and 116 closed. Liquid is withdrawn through the walls of hollow fibres in bundle 102, ascends through filtrate chamber 105, valve 106, pipe 107, and enters filtrate reservoir 108, from which it is continuously withdrawn by pump 110. Liquid is thereby continuously withdrawn from tank 1, leaving suspended solids behind. The hollow fibre bundle 102 is kept continuously submerged by additions of liquid containing more solids to tank 101.

After operating for a period, the hollow fibres become progressively fouled to the point where the rate of liquid withdrawal (as filtrate) from tank 101 is reduced and backwashing of the hollow fibres is deemed necessary. This is achieved as follows: Valve 106 is closed, and valve 112 is opened and it remains open until almost all liquid in the hollow fibre lumens in bundle 102 has been displaced through the hollow fibre walls into tank 101.

Valve 114 is then opened and gas at the higher pressure flows into the lumens, displacing residual liquid from pores in the hollow fibre walls, and erupting from the surfaces of all hollow fibres in bundle 102 as fine bubbles.

Growth and detachment of these erupting bubbles serve to lift accumulated solids from the surfaces of the hollow fibres, and to displace the resultant mixture of liquids, solids, and gas bubbles out of the hollow fibre bundle 102 into the bulk liquid in tank 101.

Valves 112 and 114 are closed and valve 116 opened briefly to exhaust residual compressed air, and allow time for pores enlarged during the blowback to relax to their normal size before the blowback. Valve 116 is then closed and valve 106 re-opened to recommence reduced-pressure induced filtration.

If the liquid is water, and the hollow fibres are hydrophilic, recommencing vacuum induced filtration will successfully fewer the fibres and immediately obtain acceptable filtration flow rates.

If the hollow fibres are hydrophobic, all of the pores which were gas-blown during the blowback will remain blocked by residual gas and surface tension supported gas-liquid interfaces within the membrane pores: only those pores which retained all their liquid will pass filtrate. Because there are few of these, filtrate flow will be unacceptably low for normal filtration. In these cases the liquid-gas interface can be progressively advanced through the membrane by sequential repetition of the following steps:

(a) valve 106 is rapidly opened for between 5 and 30 seconds. While a vacuum persists in filtrate chamber 105, vacuum induced filtration occurs through the liquid filled pores in the hollow fibre membranes. During this time gas dissolved in the filtrate emerges as bubbles while the liquid is exposed to vacuum. Also during this time, gas trapped in the membrane pores expands and yields some of its gas as detached bubbles in the lumens. These detached bubbles rise and escape through valve 106.

(b) after the 5 to 30 seconds, valve 106 is closed and degassed liquid adjacent to, and within,the membrane pores dissolves some pore gas while pressure in the lumen increases with time towards atmospheric pressure. While the pressure rises the expanded gas bubbles trapped in the membrane pores contract and are partly replaced by liquid from tank 101: gas bubbles within lumens continue to rise towards filtrate chamber 105 during this pressure rise.

(c) after a period of between 10 and 300 seconds, valve 106 is rapidly reopened again to reduce pressure rapidly and remove more gas as expanded bubbles from the liquid in the filtrate chamber 105, the lumens, and membrane pores.

(d) step (b) is repeated.

(e) steps (c) and (d) are sequentially repeated until liquid has advanced through the membrane pores to the lumens and an acceptable filtrate flow has been re-established.

Alternatively, a mechanical shock mechanism may be used to drive gas lodged in the membrane pores progressively out through the hollow fibre walls into the solids concentration tank.

Following a gas pressure induced backwash, not all pores in the hollow fibre membrane walls will have been discharged and replaced by gas. These residual liquid filled pores allow liquid to flow through them when vacuum is re-applied to the hollow fibre lumens, albeit at a lower filtrate flux than that obtained for a hollow fibre membrane in which almost all the pores are liquid filled.

The process of reflooding pores which have become partly, or completely, filled with gas is termed "re-wetting". If the membrane pore surfaces are readily wetted (i.e. hydrophilic or only weakly hydrophobic where water is the liquid), liquid requires little, or no, inducement to re-wet the membrane, and vacuum driven induction is adequate for the purpose.

If it is not readily wetted (e.g. hydrophobic) then surface tension at gas-liquid interfaces within pores in the membrane will resist movement of these gas-liquid interfaces. A pressure difference exceeding that determined by the pore surface wettability and the gas-liquid interfacial tension must be applied to produce movement of these interfaces through the membrane.

Hydraulic shock can produce a pressure wave in the liquid which will rupture these interfaces and displace them through the membrane. Sustained applied pressure in the liquid immediately following the initiating shock pressure wave will maintain that displacement to move gas out through the membrane wall and replace it by liquid.

Repeated application of hydraulic shock supported by an adequate sustained pressure in the lumen liquid for brief periods will conserve use of filtrate for this re-wetting purpose. The sequence of events, is as follows:

(i) following the gas pressure induced backwash, valves 112, 114 and 116 are closed and valve 106 opened to apply vacuum to filtrate chamber 105 and to refill this chamber and the hollow fibre lumens with filtrate until no gas pockets remain in the filtrate chamber or in the piping connecting valves 106, 112, 114 and 116 to this chamber. Valves 106, 112, 114 and 116 and their piping are arranged so that they always flood with liquid during vacuum induced filtration and retain no gas pockets.

(ii) when filtrate chamber 105 has been flooded with filtrate as described in (i) above, valve 106 is closed, and, after 1 to 5 seconds, valve 114 is opened to the high pressure gas source 115. In this instance valve 114 is a special valve of adequate open area and speed of opening, and gas pressure in source 115 is such as to impart hydraulic shock ("water hammer") to the filtrate in chamber 105, and cause a pressure wave to travel through the filtrate, down the hollow fibre lumens, and onto the gas-liquid interfaces within the hollow fibre membrane walls of bundle 102, when valve 114 is suddenly opened.

(iii) valve 114 remains open for between 1 and 20 seconds to sustain pressure in the hollow fibre lumens without draining filtrate chamber 105 before closing.

(iv) valve 106 opens after a further brief delay to withdrawn all gas from filtrate chamber 105.

(v) operations (ii) and (iii), described immediately above, are repeated.

(vi) steps (iv) and (v) are repeated until the hollow fibre membranes are sufficiently re-wetted to provide an adequate rate of filtration when vacuum induced filtration is recommended.

Figure 14:
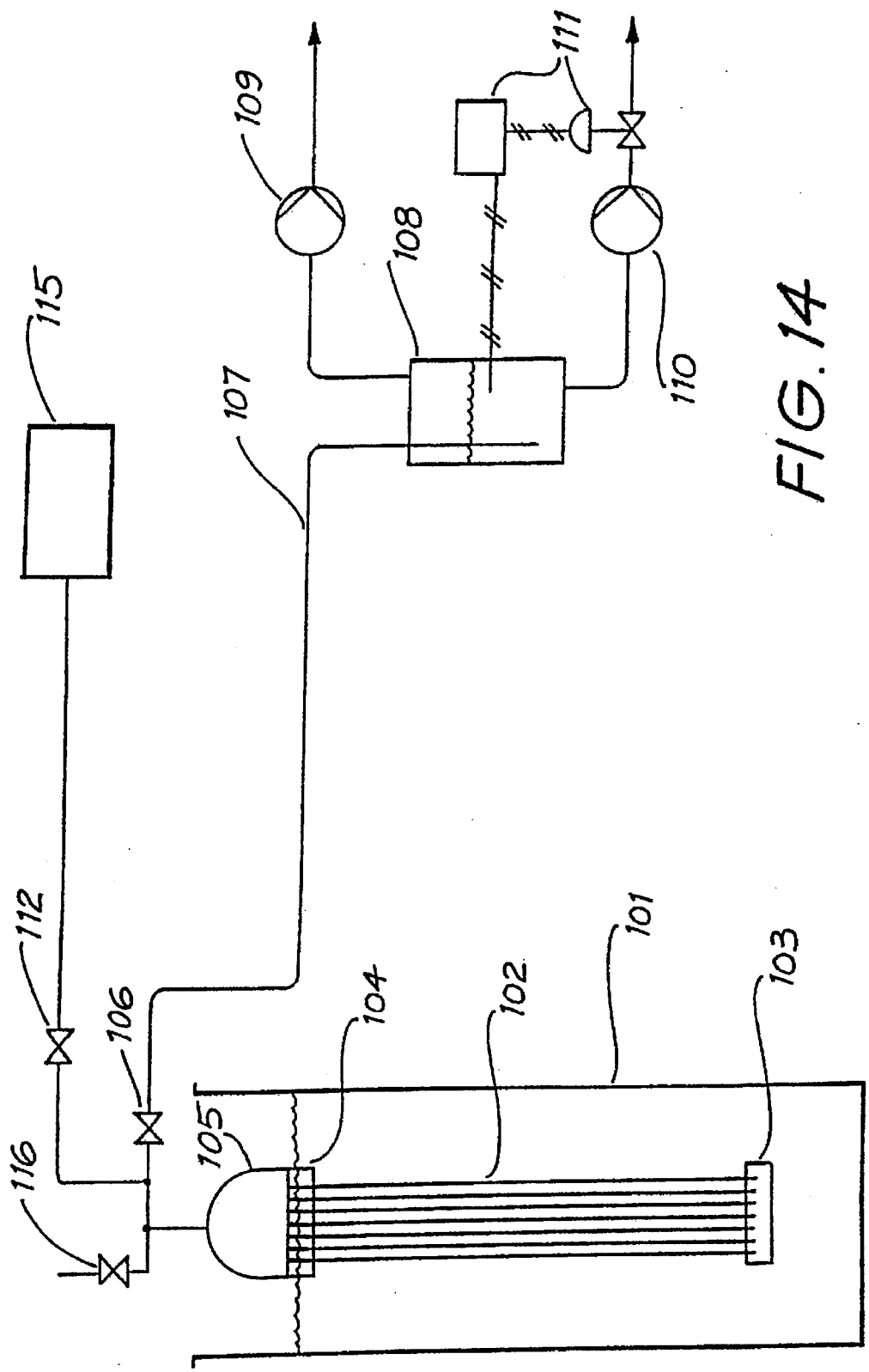
FIG. 14 is a schematic diagram of a hollow fibre concentrator employing negative pressure induced filtration, and a liquid backwash system according to a fourth embodiment of the invention.

The hollow fibre concentrator shown in FIG. 14 employs vacuum induced filtration with a liquid backwash system employing a hydraulic shock driven by gas pressure.

In this embodiment of the invention, lowered pressure induced filtration proceeds as described for the embodiment of FIG. 13 but backwashing is conducted by a rapid reversal of liquid flow through the membrane walls of hollow fibres without gas displacing the liquid through the membrane: gas at a high pressure is admitted suddenly to induce a very rapid rise in the liquid pressure in the lumens of the hollow fibres.

The rate of pressure rise is rapid enough to produce mechanical shock ("water hammer") so that a pressure wave travels through the liquid in the hollow fibre lumens and produces a sudden reverse flow of small amplitude through the pores of the hollow fibre walls.

This sudden, brief reverse flow provides the initial cleaning action by loosening solids trapped in the outer pores of the hollow fibre walls. Sustaining the high pressure continues this initial, very rapid acceleration of liquid flow through the pores so that more liquid from the lumens follows into the hollow fibre walls and serves to sweep out solids trapped in the outer pores which have been loosened by the initial pressure wave. Exposure to the high pressure gas is terminated before any gas can enter pores in the hollow fibre walls.

The hollow fibre concentrator shown in FIG. 14 consists of a bundle of hollow fibres 102 encased within cast resin blocks 103 and 104, with filtrate chamber 105, tank 101 (containing solids suspended in liquid), lowered pressure induction system consisting of valve 106 and pipe 107, filtrate receiving tank 108, vacuum pump 109, filtrate pump 110, and level control system 111 having the same description, and operation for vacuum induced filtration, as already described above for FIG. 13.

After concentrating solids in tank 101 by lowered pressure induced filtration for a period, the hollow fibres become progressively fouled and backwashing is needed to recover an acceptable rate of filtration.

In this embodiment of the invention, backwashing is achieved by the following sequence of operations:

(i) valve 106 is closed to cease filtration, and a period of between 3 and 60 seconds allowed for the system to settle before (ii) valve 112 is opened very rapidly. In this instance valve 112 is a special valve whose time to fully open from a fully closed position occupies less than 0.5 seconds and whose size ensures that the rate of pressure rise in the liquid in filtrate chamber 105 produces a pressure wave which travels as a shock wave through the liquid. To this end, valve 112 is positioned close to filtrate chamber 105 and arranged so that the downstream side of valve 112 is flooded by liquid while the upstream side is exposed to high pressure gas from the reservoir 115. Valves 106 and 116 remain closed during this time.

(iii) valve 112 remains open for a brief period only; typically this period is less than 10 seconds.

(iv) valve 112 closes, and, after an interval between 0 and 10 seconds, valve 116 opens to exhaust the high pressure gas which has entered filtrate chamber 105, to atmosphere. These actions are to ensure that filtrate chamber 105 is not totally drained of its liquid. If this were to occur, high pressure gas could enter hollow fibre lumens below resin plug 104 and enter the membrane pores.

(v) valve 116 is closed and valve 106 opens, and remains open for a sufficient period to withdraw all air from filtrate chamber 105 and flood the downstream sides of valves 112 and 116 with liquid. To this end, valves 112 and 116, and their connections to filtrate chamber 105 are arranged to ensure that gas pockets on the filtrate chamber side of valves 106, 112 and 116 are removed during this operation.

(vi) operations (i) to (v) are repeated to clean the membrane further using the shock-induced loosening, and the brief high gas pressure driven liquid reverse flow described above.

(vii) if required, operation (vi) is repeated more times before the system is returned to the vacuum induced filtration mode.

Figure 15:
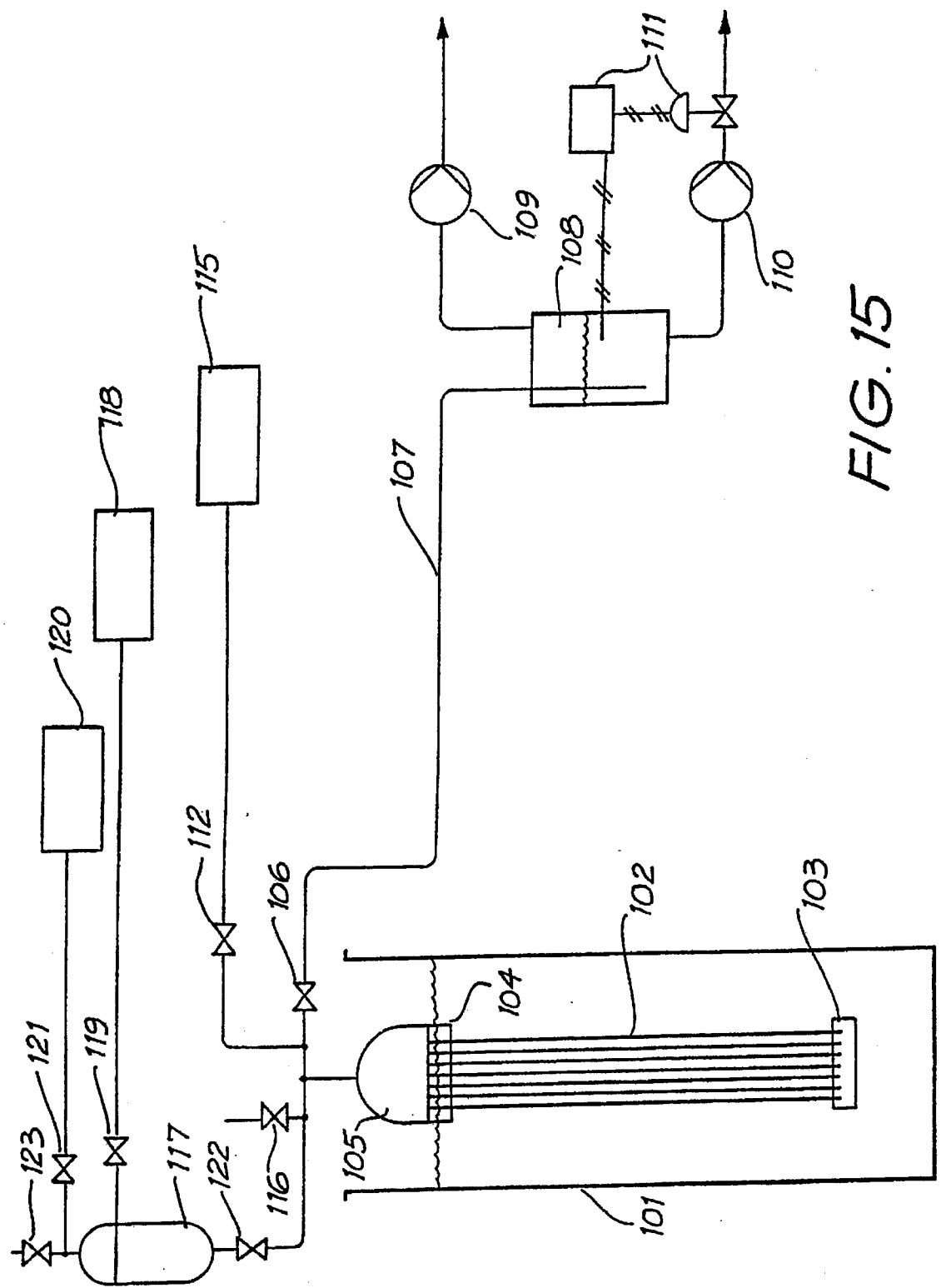
FIG. 15 is a schematic diagram of a hollow fibre concentrator of the kind shown in FIG. 14 with an additional system to assist the backwash.

The hollow fibre concentrator shown in FIG. 15 is similar to that of FIG. 14 but employs an additional system to supply water super-saturated with soluble gas to assist the backwash.

The embodiment of FIG. 15 differs from the embodiment of FIG. 14 by having an additional pressure chamber 117 fitted with vent valve 123 connected to clean water supply by valve 119, and to compressed soluble gas(es) supply by valve 121, and to filtrate chamber 105, by valve 122.

Negative pressure induced filtration follows the procedure already described for the first embodiment of this invention. During the vacuum induced filtration period, valve 122 remains closed, and pressure chamber 117 is charged with enough additional fresh clean water by opening vent valve 123, and clean water supply valve 119, to replace the water used in the previous backwash. Valves 119 and 123 are closed, and valve 121 opened to admit compressed gas which dissolves in the clean water in pressure chamber 117. The compressed gas pressure in chamber 117 is regulated at this stage so that the gas remains dissolved in the water as a super-saturated solution when subsequently delivered without shock into the lower pressure regions of filtrate chamber 105 and the lumens and membrane walls of the bundle of hollow fibres 102.

When filtration ceases, and backwashing is to begin, valve 106 is closed and the pressure in filtrate chamber is allowed to rise to almost ambient pressure. Valve 122 then opens slowly to admit sufficient water super-saturated with dissolved gas to displace and replace the filtrate in filtrate chamber 105, and in the lumens and walls of hollow fibres in bundle 102. Valve 122 is then closed.

Valve 112 then opens suddenly to induce a shock pressure wave which causes super-saturated gas to be released from solution in the liquid in filtrate chamber 105 and in the lumens and walls of the hollow fibre bundle 102. This release of gas assists reverse two-phase flow of soluble gas and water through the hollow fibre membranes and serves to clean the hollow fibres of accumulated solids.

Figure 16:
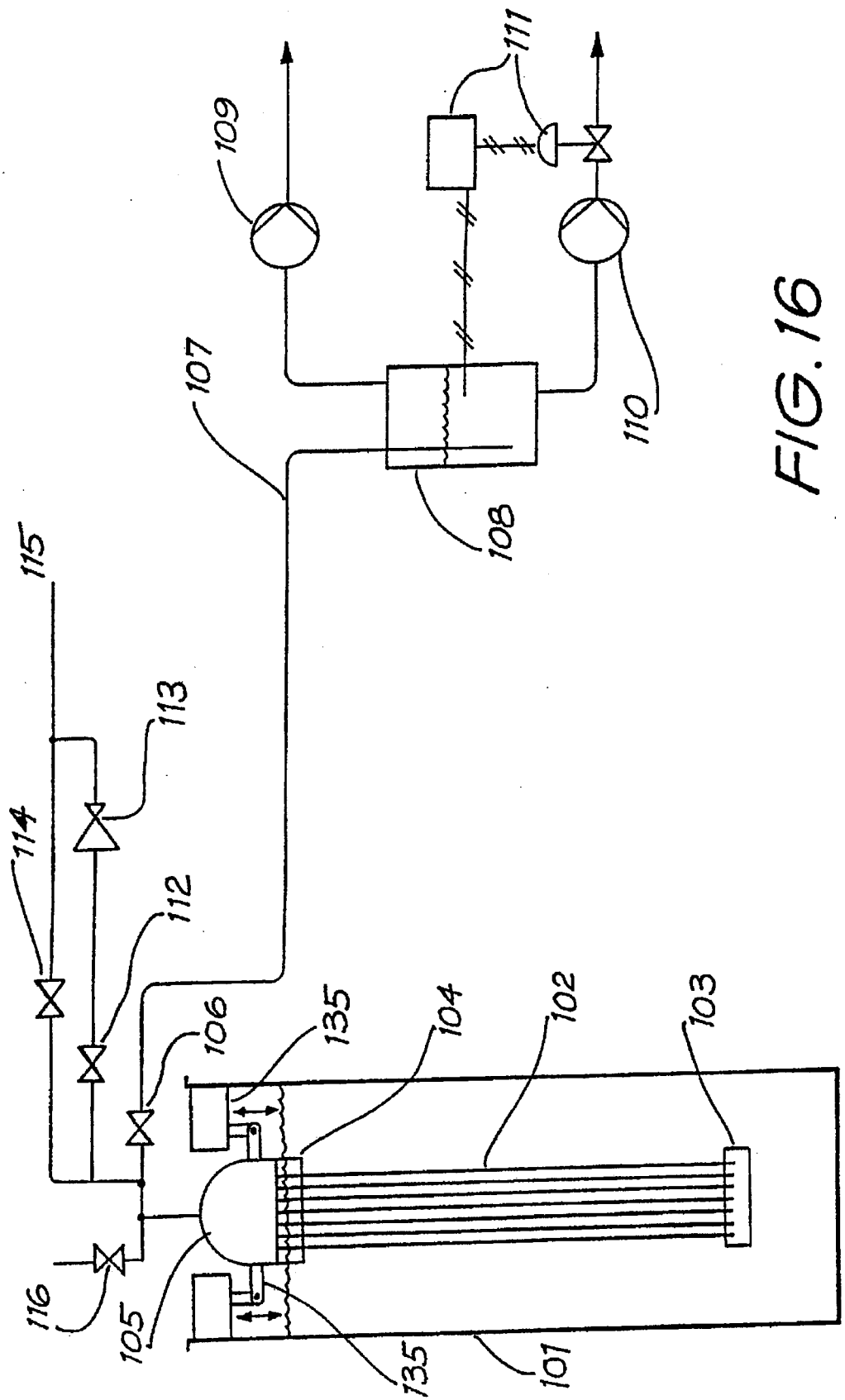
FIG. 16 is a schematic diagram of a modification of the system shown in FIG. 13 with mechanical means of agitating the hollow fibres filter assembly during a backwash.
Figure 17:
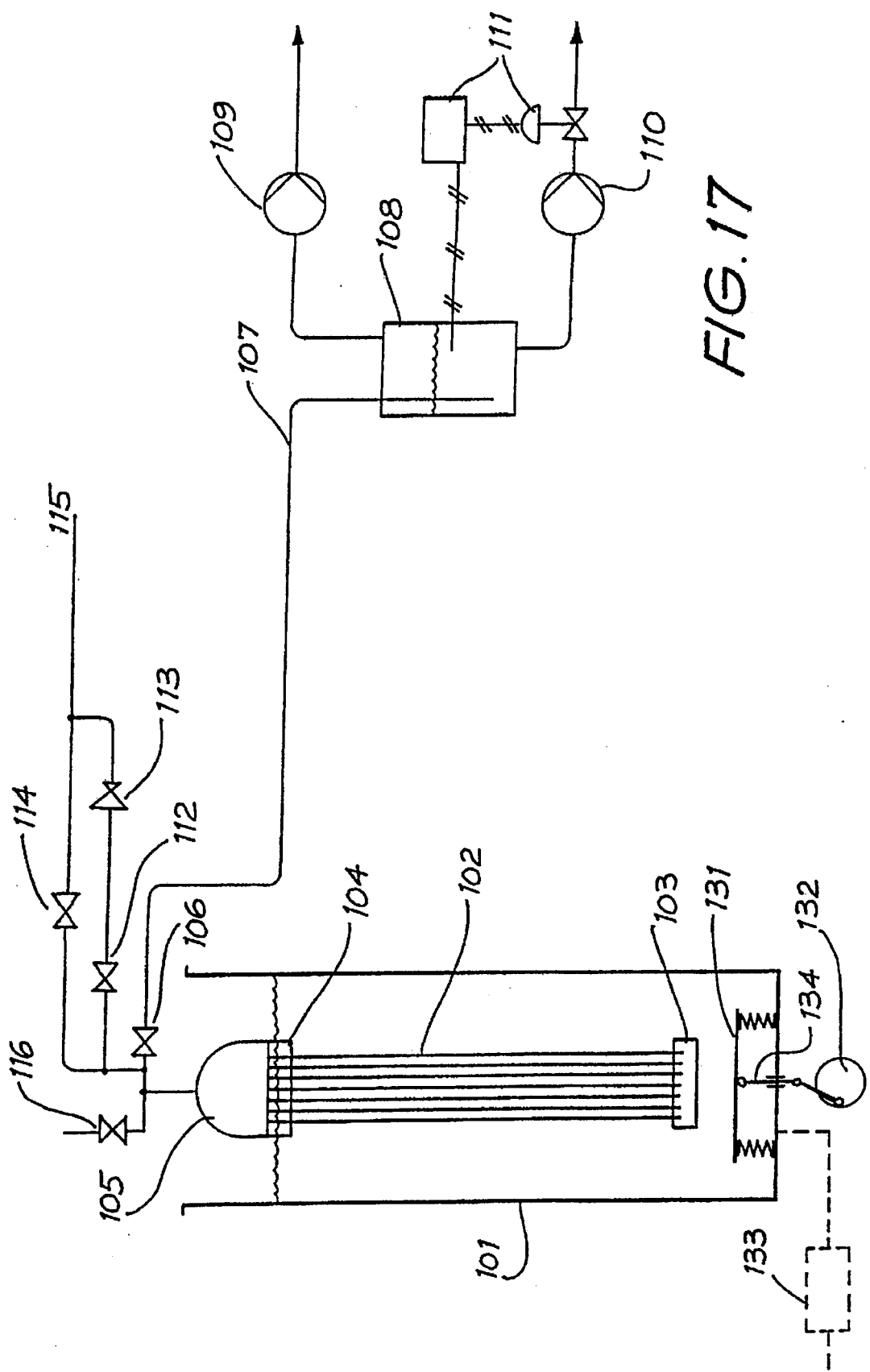
FIG. 17 is a schematic diagram of a modification of the system shown in FIG. 13 with agitated paddle means of agitating concentration tank contents during a backwash.

FIGS. 16 and 17 show a variation of the FIG. 13 embodiment which may also be applied to the embodiments of FIGS. 14 and 15. In the FIG. 16 variation, the cast resin plug 103, encasing and sealing the bottom ends of hollow fibre bundles 102, is of such mass and density as to prevent hollow fibres 102 rising due to buoyancy during backwashing or filtration.

Filtrate chamber 105 is mechanically connected to mechanism 135 which induces oscillation of filtrate chamber 105, hollow fibre 102, and resin blocks 104 and 103 when actuated. These oscillations are a reciprocating motion in a generally vertical direction. During filtration the oscillatory mechanism remains inactive. It is activated only during backwashings while the bundle of hollow fibres 102 remains submerged in liquid, and serves to assist displacement of solids suspended between the hollow fibres of bundle 102 which have been, or are being, loosened and ejected by liquid, or gas, or both liquid and gas, issuing from the hollow fibre pores during the backwash reverse flow periods.

In the FIG. 17 variation, the suspension of solids in the feed liquid in tank 101 is agitated by a paddle 131 to which is imparted oscillatory motion, largely in a vertical direction, by mechanical means 132, or by means of an attached diaphragm motor 134 driven by external device 133, which feeds air or water pressure fluctuations to motor 134. This agitates the liquid contents of the tank to assist cleaning of the hollow fibre bundle 102, during backwash reverse flow periods as described in relation to FIG. 16

Figure 18:
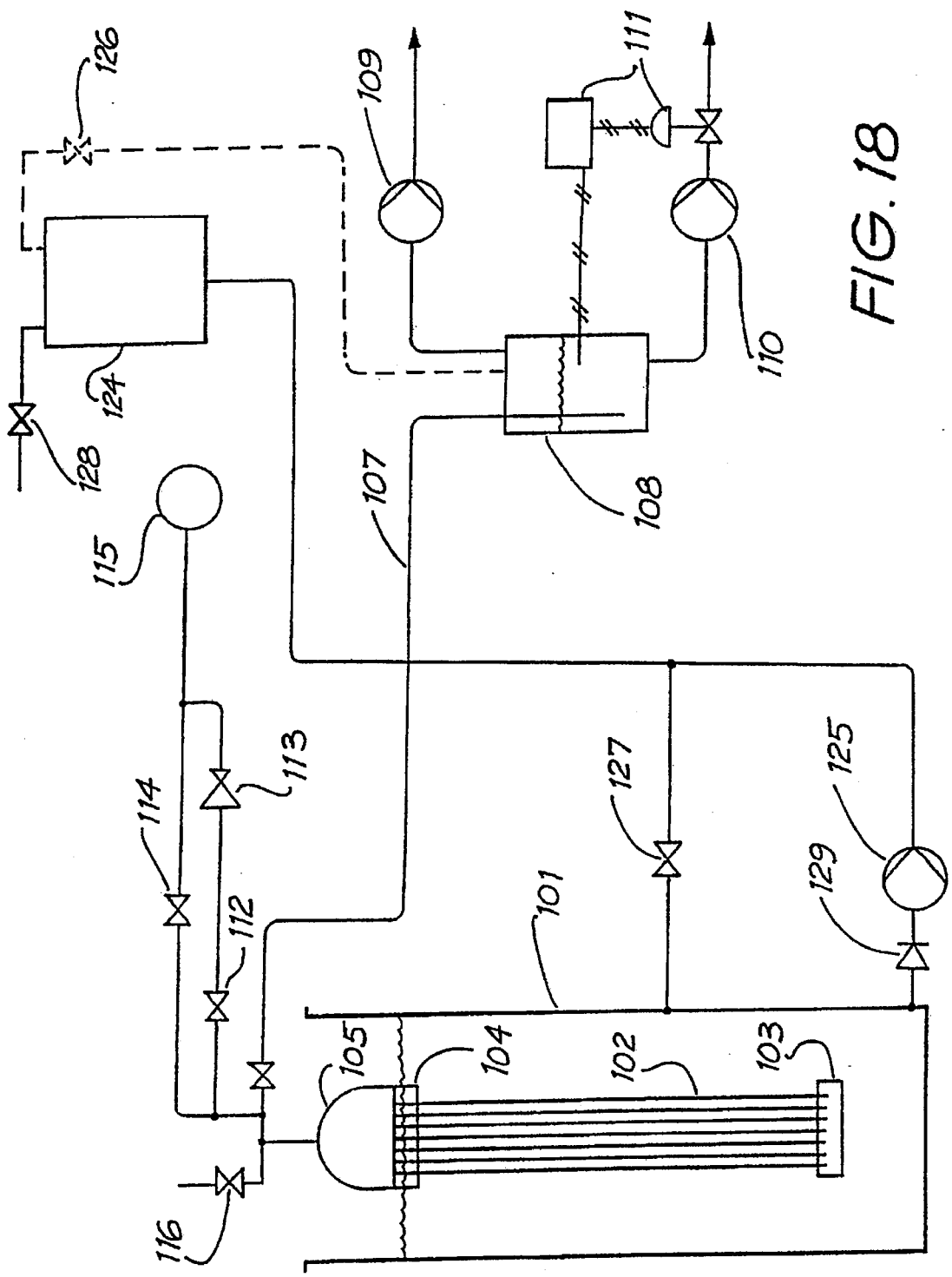
FIG. 18 is a schematic diagram of the concentrator shown in FIG. 13 with an additional system allowing emptying of the concentrator tank contents during a backwash.

The hollow fibre concentrator shown in FIG. 18 is similar to the concentrator of FIG. 13 but has an additional system which allows emptying of the concentrator tank during backwash.

Negative pressure induced filtration continues as described for the FIG. 13 embodiment until backwashing is deemed necessary. Backwashing is effected by the following sequence of operations (i) to (v):

(i) valves 126 and 127 are normally closed. Valve 129 is a non-return valve. Valves 114 and 116 remain closed. Valve 106 is closed and valve 112 is opened, and it remains open until almost all liquid in the hollow fibre lumens in fibre bundle 102 has been displaced through the hollow fibre walls into tank 112.

(ii) valve 112 is closed while the contents of tank 101 are transferred to a separate reservoir 124, until the bundle of hollow fibres 102 is no longer submerged in liquid. This transfer can be effected either by operation of a liquid transfer pump 25 or by applying a vacuum to reservoir 124 by closing valve 128 and opening valve 126 for sufficient time to effect the liquid transfer from tank 101 to reservoir 124.

(iii) valve 114 is opened and gas at the higher pressure flows rapidly into the lumens, displacing residual liquid from pores in the hollow fibre walls, and erupting from the surfaces of all hollow fibres in bundle 102 as bubbles followed by small air jets. This process sweeps accumulated solids out on the membrane pores and from attachment to the membrane surfaces, to assemble loosely within the bundle of hollow fibres 102, or to fall into tank 101.

(iv) Valve 114 is closed and the contents of reservoir 124 are returned to tank 101 by opening valves 127 and 128 so that hollow fibres bundle 102 becomes again submerged.

(v) when the fibre bundle is submerged valve 114 is again opened, and emerging gas serves to displace loosened solids from between the hollow fibres of bundle 102 into the bulk liquid in tank 101.

Rewetting of the hollow fibres membranes follows and is accomplished by one of the methods described above for the embodiments of FIGS. 13, 14 and 15.

Figure 19:
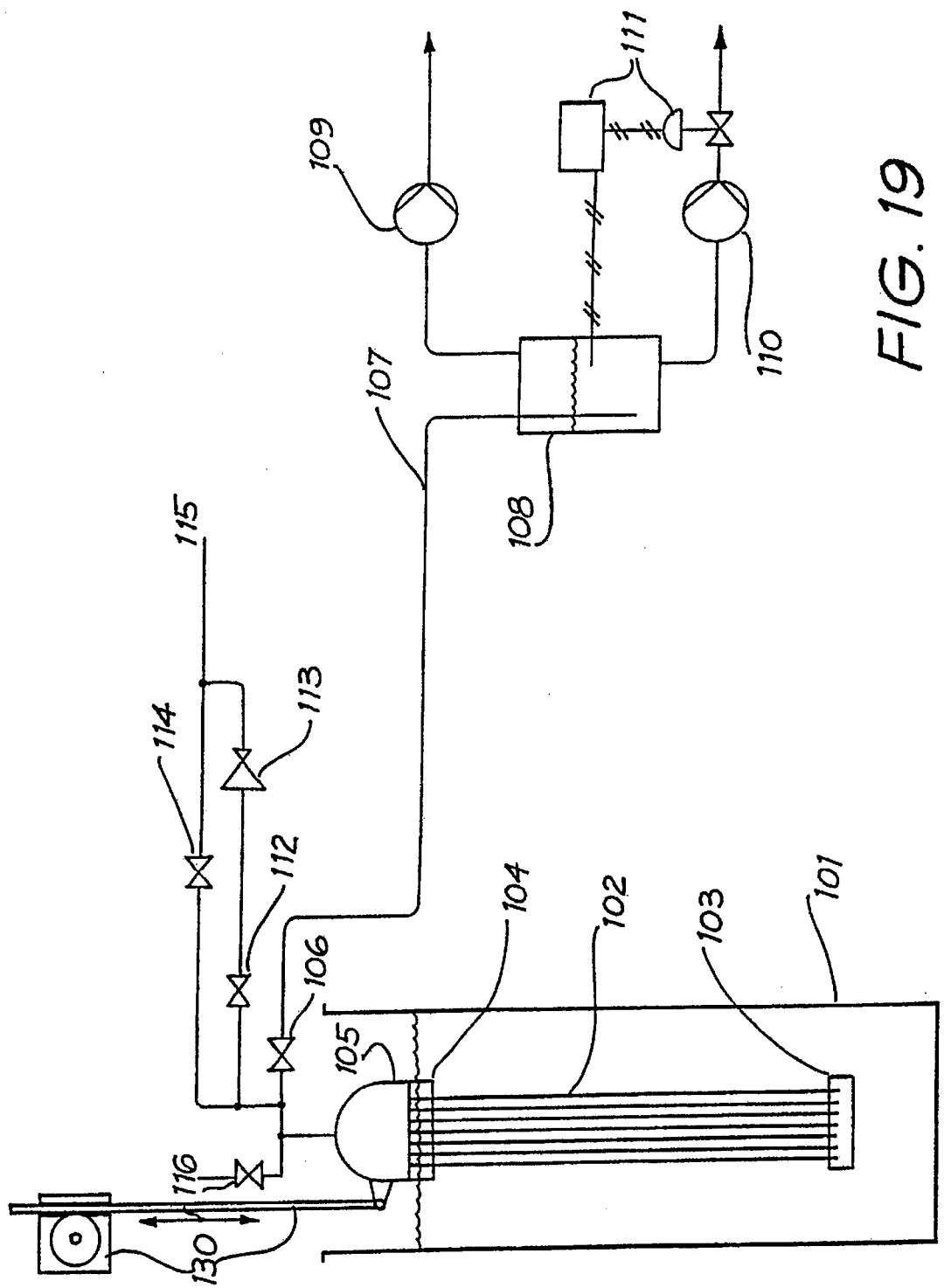
FIG. 19 is a schematic diagram of the concentrator shown in FIG. 13 with an additional system allowing the hollow fibre filter assembly to be raised clear of the liquid during a backwash.

The hollow fibre concentrator shown in FIG. 19 is similar to the concentrator of FIG. 13 but has an additional system which raises the hollow fibre filter assembly clear of the liquid during a backwash.

The sequence of operations during a backwash, is as follows:

(i) valves 114 and 116 remain closed. Valve 106 is closed and valve 112 is opened, and it remains open until almost all liquid in the hollow fibre lumens in bundle 102 has been displaced through the hollow fibre walls into tank 101.

(ii) valve 112 is closed while the assembly comprising items 102, 103, 104, 105, 106, 112, 114 and 116, are lifted up by mechanical means 130 so that only the lower cast resin block 103 remains submerged in liquid tank 101.

(iii) valve 114 is opened and gas at the higher pressure flows rapidly into the lumens, displacing residual liquid from pores in the hollow fibre walls, and erupting from the surfaces of all hollow fibres in bundle 102 as bubbles followed by small air jets. This process sweeps accumulated solids out of the membrane pores and from attachment go the membrane surfaces, to assemble loosely within the bundle of hollow fibres 102, or to fall into tank 101.

(iv) valve 114 is closed and the assembly comprising items 102, 103, 104, 105, 106, 112, 114 and 116 is lowered by the mechanical means 130 until the bundle of hollow fibres 102, and the cast resin plug 104, are below the surface of the liquid in tank 101.

(v) when fibre bundle 102 is submerged, valve 114 is again opened and emerging gas serves to displace loosened solids from between the hollow fibres of bundle 102 into the bulk liquid in tank 101.

Rewetting of the hollow fibres membranes follows and is accomplished by one of the methods described above for the embodiments of FIGS. 13, 14 and 15.

During step (v) of the sequence of operation of the embodiments of FIG. 18 and FIG. 19, the assembly of items 102, 103, 104, 105, 106, 112, 114 and 116, comprising the bundle of hollow fibres 102, filtrate chamber 105, and its attached valves may be oscillated by a mechanical means 135, as described in relation to FIG. 16.

During step (v) of the sequence of operation of the embodiments of FIG. 18 and FIG. 19, the suspension of solids as the liquid in tank 101 may be agitated by a paddle 131, as described in relation to FIG. 17.

Figure 20:
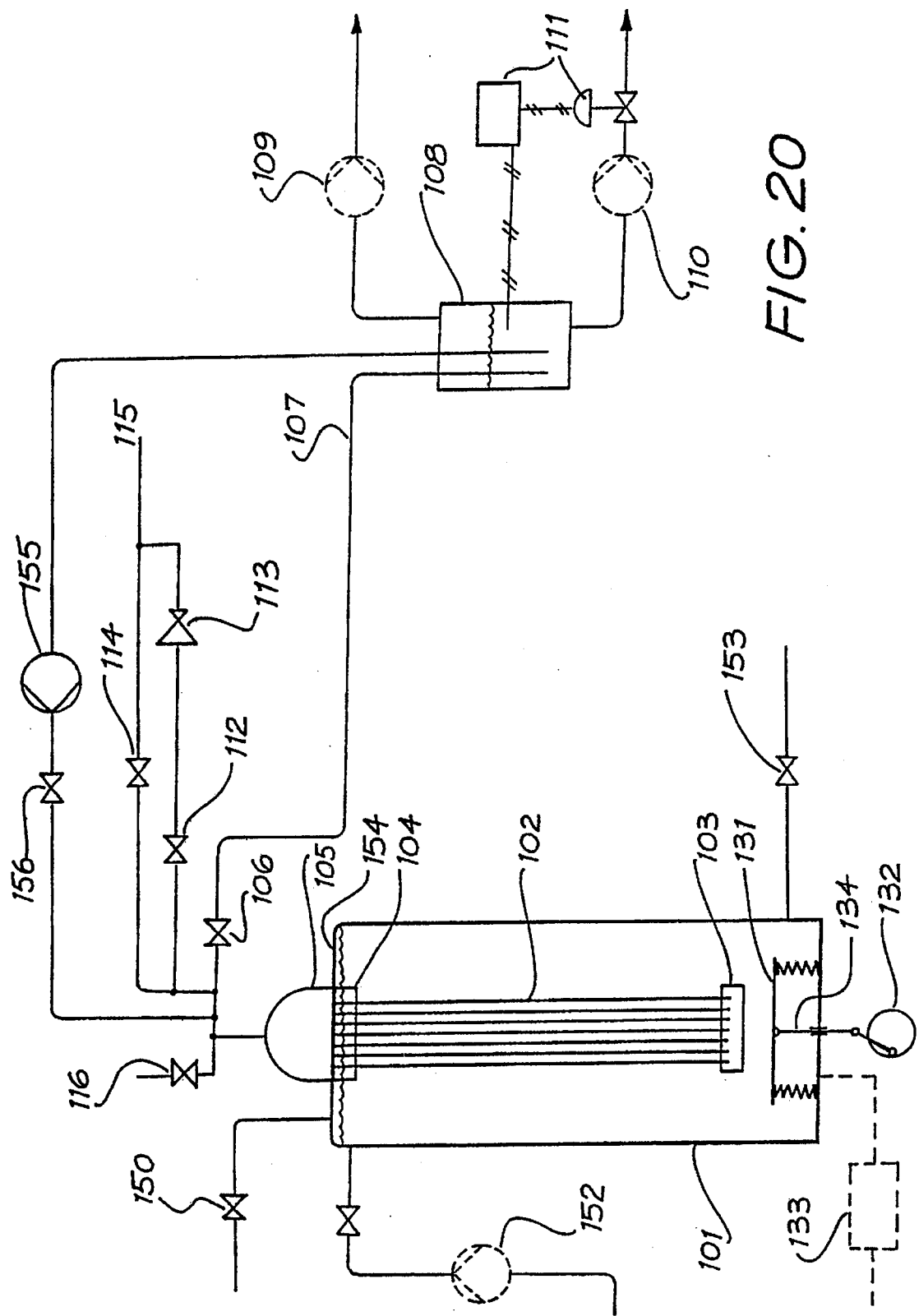
FIG. 20 is a schematic diagram of a modified form of the concentrator shown in FIG. 17 and, FIG. 21 is a schematic diagram of a modified form of the concentrator shown in FIG. 20.

FIG. 20 shows yet another embodiment of the invention in which the vessel is no longer open to atmospheric pressure, but is enclosed, and encloses a single filter element or a plurality of filter elements. Vacuum induced filtration can be employed as already described in which case fresh feed is drawn into the closed vessel through feed valve 151 (feed pump 152 can be omitted) as filtrate is withdrawn through line 107, into tank 108, or the feed may be delivered under pressure to the closed vessel by pump 152 through feed valve 151 (pumps 109 and 110 are no longer necessary).

When filtration is ceased by closure of valve 106, or valve 151, gas-pressure driven backwashing is accomplished as described for the FIG. 13 embodiment. Gas-pressure backwashing may be accompanied by agitation of the tank 101 liquid contents imparted by oscillatory motion of the paddle 131 of the FIG. 17 embodiment.

The vessel 101 is enclosed with the filtrate header 105. It can be opened to atmospheric pressure by opening of valve 150. The purpose of closing the vessel to atmospheric pressure is to facilitate rewetting of the hollow fibre membranes after a gas pressure driven backwash where the membrane is distinctly non-wetting, e.g. hydrophobic, with respect to the liquid and none of the previously described rewetting methods are appropriate. To fewer the membranes in this way, following gas-driven backwash, the following operations are conducted in sequence.

(i) vessel 101 is first closed against the escape of fluid from the vessel by closure of valves 150 and 153 leaving feed valve 151 open. Valve 106 is open and liquid is drawn through the hollow fibre membranes by application of vacuum through line 107 using pumps 109 and 110, or feed is pressure-fed to tank 101 by pump 152, until the filtrate system and its piping are liquid filled up to valve 106. This passage of liquid through the membrane wall relies on the gas driven backwash having left some of the pores through the membrane liquid filled: the bulk of the pores will have been purged of liquid and will be gas filled.

(ii) the filtrate delivery system is closed by closure of the filtrate delivery valve 106 and pressure in the filtrate header 105 and hollow fibre lumens, and the closed vessel 101 is raised either by:

(a) delivery from high pressure liquid pump 155 through valve 158, or (b) by admitting compressed gas through valve 114 to a high point in the filtrate system. This action increases pressure in the lumens, membrane pores and the closed vessel 201 and serves to compress gas bubbles within the membrane pores decreasing their volume and allowing liquid to flow into the membrane pores behind the compressed gas.

(iii) pressure in the vessel is reduced by opening of either valve 150 or 151. This is followed almost immediately by the opening of valve 106 to reduce pressure in the filtrate header 105. The first reduction of vessel pressure allows the compressed gas bubbles in the membrane wall to expand in the direction of the reduced pressure: they expand out of the membrane walls into the vessel. The second action limits the driving of further filtrate out of the lumens and into the vessel.

(iv) the operations listed under (i) to (iii) immediately above are repeated to compress residual gas bubbles remaining in the membrane wall and expel them into the vessel. They are repeated again if necessary until a satisfactory subsequent filtration rate through the membrane, which has had gas bubbles within its membrane replaced by liquid during the gas-driven backwash, is obtained.

The FIG. 20 system could also be applied to the other embodiments of the invention by incorporating a closed vessel to accommodate a pressure driven rewetting system as described above.

Figure 21:
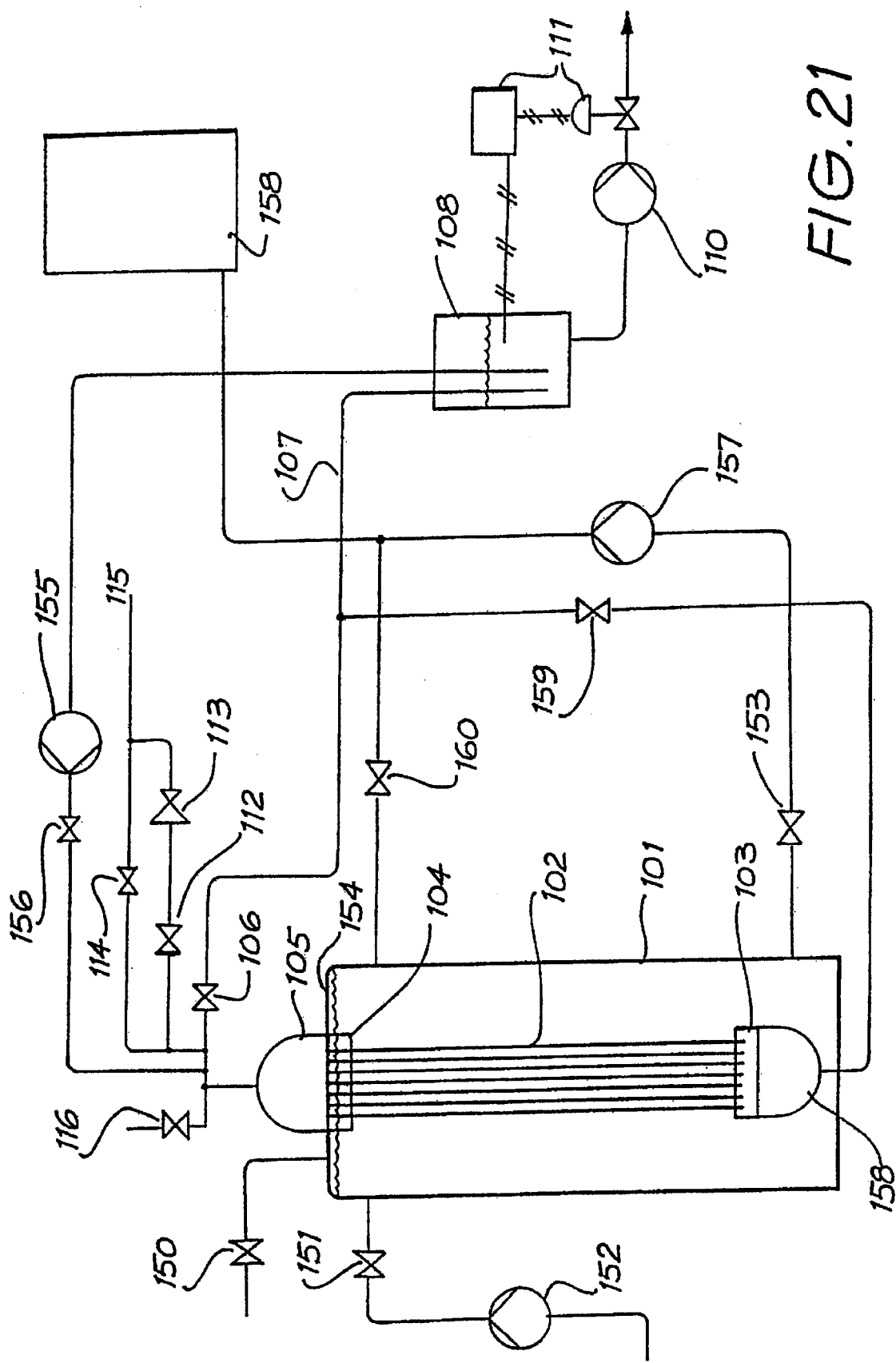

FIG. 21 shows yet another embodiment of the invention in which the vessel is no longer open to atmospheric pressure, but is enclosed and encloses a single filter element or a plurality of filter elements. Pressure driven filtration can be employed as already described, in which case fresh feed is pumped into the closed vessel through feed valve 151 from feed pump 152, and filtrate is withdrawn through line 107, into tank 108.

When filtration is ceased by closure of valve 106, gas-pressure driven backwashing is accomplished as described for the FIG. 13 embodiment.

Alternatively, the installation of FIG. 21 can be operated as a pressure fed filter and can be periodically backwashed according to Steps B or Steps C or earlier described with filtrate in the lumens being withdrawin via header 158.

The vessel 101 is enclosed with the filtrate header 105. (Note in this example provision of second filtrate header, 158). Vessel 101 can be opened to atmospheric pressure by opening of valve 150. The purpose of closing the vessel to atmospheric pressure is to facilitate rewetting of the hollow fibre membranes after a gas pressure driven backwash where the membrane is distinctly non-wetting, e.g. hydrophilic, with respect to the liquid and none of the previously described rewetting methods are appropriate. To fewer the membranes in this way, following gas-driven backwash, the operations (i) through (iv) above for FIG. 20 are conducted in sequence.

The gas-driven backwash in the case of FIG. 21 consists of the following steps:

(a) valve 106 and 151 are closed and valve 150 opened. Valve 160 remains closed, (b) valves 112 and 159 are opened and lower pressure gas displaces liquid from filtrate headers 105 and 158, and from the fibre lumens into receiver 108, (c) at the same time as operation (b) valve 153 opens and pump 157 transfers the contents of tank 101 to tank 158, (d) valve 114 is opened and higher pressure gas displaces liquid from the membrane pores of fibre bundle 102, providing a gas-driven backwash, (e) valves 160 and 153 open with pump 157 stopped to refill tank 101, (f) when tank 101 is refilled pump 157 restarts to sweep liquid over the fibres bundle 102 while gas is still issuing from the fibre membrane, and, (g) valves 112, 114, 153 and 160 close, pump 157 stops, and the gas pressure driven rewetting process begins.

It should be understood that although the description concerns a single fibre bundle operating within a tank of liquid, the invention is not limited to such, since it may often be economically preferable to employ a plurality of such bundles within such a tank.

The above describes only some embodiments of the present invention and modifications obvious to those skilled in the art can be made thereto without departing from the scope and spirit of the present invention.

We claim:

1. A method of concentrating the solids of a liquid suspension within a vessel consisting of:

(i) applying the liquid suspension under pressure within a vessel to the outer surface of elastic, microporous, hollow fibers or tubular filter elements to induce and sustain filtration through the membrane walls wherein:

(a) some of the liquid suspension passes through the walls the fibers to be drawn off as clarified liquid or filtrate from the hollow fiber lumens, and (b) at least some of the solids are retained on or in the hollow fibers or otherwise as suspended solids within the liquid of the vessel enclosing the tubular filter elements, (ii) dislodging the retained solids from the fibers by applying a dislodging medium through the lumens after opening the vessel to atmospheric pressure, wherein the application of the dislodging medium is initially conducted so as to displace liquid within the hollow fiber lumens through the hollow fiber membrane with gas at a pressure below the bubble point of the pores of the fibers followed by subsequent admission to the hollow fiber lumens of gas at a pressure substantially higher than the bubble point of the pores to drive liquid retained in the membrane pores outwards allowing the gas in the lumens to follow the liquid through the fiber walls to provide effective cleaning and scouring event at the most distant point from the lumen inlet thus reducing the natural tendency in a liquid only reverse flow backwash towards preferential washing of pores near the lumen inlet.

2. The method of claim 1 wherein said method is carried out as a continuous process utilising a repetitive cycle of solid accumulation and solid discharge.

3. A method of backwashing a microporous filter said filter having a liquid suspension under pressure within a vessel applied to the outer surface of elastic microporous hollow fibers or tubular filter elements to induce and sustain filtration through the membrane walls, wherein, (a) some of the liquid suspension passing through the walls of the fibers is drawn off as clarified liquid or filtrate from the hollow fiber lumens and (b) at least some of the solids being retained on or in the hollow fibers or otherwise as suspended solids within the liquid of the vessel enclosing the tubular filter elements, the method of backwashing including dislodging the retained solids from the fibers by applying a dislodging medium through the lumens after opening the vessel to atmospheric pressure, wherein the application of dislodging medium is initially conducted so as to display liquid within the hollow fiber lumens through the hollow fiber membrane with a gas at a pressure below the bubble point of the pores of the fibers followed by subsequent admission to the hollow fiber lumens of a gas at a pressure substantially higher than the bubble point of the pores, to drive liquid retained in the membrane pores outwardly, allowing gas in the lumens to follow the liquid through the fiber walls to provide effective cleaning and scouring event at the most distant point from the lumen inlet thus reducing the natural tendency in a liquid only reverse backwash towards preferential washing of pores near the lumen inlet.

* * * * *